US012659395B2

(12) United States Patent
Kim et al.

(10) Patent No.: US 12,659,395 B2
(45) Date of Patent: Jun. 16, 2026

(54) CRADLE FOR MOUNTING SMART DEVICE AND BATTERY COUPLED THERETO

(71) Applicant: SPS INC., Daejeon (KR)

(72) Inventors: Hyun-Jun Kim, Daejeon (KR);
Moon-Seok Chae, Daejeon (KR);
Seung-Ju Jeong, Daejeon (KR)

(73) Assignee: SPS INC., Daejeon (KR)

( * ) Notice: Subject to any disclaimer, the term of this patent is extended or adjusted under 35 U.S.C. 154(b) by 295 days.

(21) Appl. No.: 18/568,759

(22) PCT Filed: Jun. 3, 2022

(86) PCT No.: PCT/KR2022/007959
§ 371 (c)(1),
(2) Date: Dec. 8, 2023

(87) PCT Pub. No.: WO2022/260378
PCT Pub. Date: Dec. 15, 2022

(65) Prior Publication Data
US 2024/0275877 A1     Aug. 15, 2024

(30) Foreign Application Priority Data

Jun. 9, 2021   (KR) ........................ 10-2021-0075096
Dec. 23, 2021   (KR) ........................ 10-2021-0185811

(51) Int. Cl.
H04M 1/04          (2006.01)
H01M 50/247          (2021.01)

(52) U.S. Cl.
CPC ........... H04M 1/04 (2013.01); H01M 50/247 (2021.01); H01M 2220/30 (2013.01)

(58) Field of Classification Search
CPC .............. H02J 7/00; H04M 1/02; H01R 13/52
See application file for complete search history.

(56) References Cited

U.S. PATENT DOCUMENTS 7,311,526  B2    12/2007  Rohrbach et al.
7,517,222  B2    4/2009  Rohrbach et al.
(Continued)

FOREIGN PATENT DOCUMENTS

JP          2014153976  A      8/2014
JP          2015502128  A      1/2015
(Continued)

OTHER PUBLICATIONS

International Search Report for Application No. PCT/KR2022/007959, dated Sep. 6, 2022.
(Continued)

*Primary Examiner* — Un C Cho
(74) *Attorney, Agent, or Firm* — McCoy Russell LLP

(57)          ABSTRACT
A cradle for mounting a smart device, according to the present invention, includes: a device support portion for supporting the rear side of the smart device; and a battery accommodating portion provided on the basis of the device support portion and accommodating a battery capable of supplying power to the smart device through a device electrode portion provided in the smart device. According to the present invention, the charging inconvenience of having to insert a power plug one by one into the cradle to charge the smart device, and furthermore, the inconvenience of managing power plugs, of having to provide a plurality of power plugs to charge a plurality of smart devices can be resolved at once.

19 Claims, 22 Drawing Sheets

(56)     References Cited

U.S. PATENT DOCUMENTS

| | | | | |
|---|---|---|---|---|
| 7,637,746 | B2 | 12/2009 | Lindberg et al. | |
| 9,088,097 | B2* | 7/2015 | Kim | H01R 24/38 |
| 9,864,407 | B2* | 1/2018 | Zhao | G06F 1/1632 |
| 10,404,105 | B2* | 9/2019 | Gajiwala | H01F 27/36 |
| 2013/0058023 | A1* | 3/2013 | Supran | H05K 7/00 |
| | | | | 361/679.01 |
| 2013/0278207 | A1* | 10/2013 | Yoo | H02J 7/00 |
| | | | | 320/108 |
| 2015/0171649 | A1* | 6/2015 | Kim | H02J 7/0044 |
| | | | | 320/114 |
| 2019/0013687 | A1* | 1/2019 | Shevde | H02J 50/00 |
| 2019/0198212 | A1* | 6/2019 | Levy | F16M 11/2021 |
| 2019/0220059 | A1* | 7/2019 | Miles | H01R 13/6205 |
| 2019/0237985 | A1* | 8/2019 | Piunti | H02J 50/10 |
| 2019/0334358 | A1* | 10/2019 | Fountain | H04M 1/04 |
| 2021/0218277 | A1* | 7/2021 | Nahum | H02J 7/02 |
| 2022/0352741 | A1* | 11/2022 | Luzinski | H02J 50/12 |

FOREIGN PATENT DOCUMENTS

| | | | |
|---|---|---|---|
| JP | 2017127149 | A | 7/2017 |
| JP | 2018011463 | A | 1/2018 |
| JP | 2018088614 | A | 6/2018 |
| JP | 2021071759 | A | 5/2021 |
| KR | 2000-0000058 | U | 1/2000 |
| KR | 2006-0062840 | A | 6/2006 |
| KR | 2011-0008333 | U | 8/2011 |
| KR | 2011-0456008 | Y1 | 10/2011 |
| KR | 2012-0070414 | A | 6/2012 |
| KR | 2012-0092455 | A | 8/2012 |
| KR | 2013-0004157 | A | 1/2013 |
| KR | 2014-0001286 | U | 3/2014 |
| KR | 2014-0003090 | U | 5/2014 |
| KR | 2014-1391547 | B1 | 5/2014 |
| KR | 2015-0116089 | A | 10/2015 |
| KR | 2015-0129418 | A | 11/2015 |
| KR | 2016-0121300 | A | 10/2016 |
| KR | 2017-0038358 | A | 4/2017 |
| KR | 2017-1797486 | B1 | 11/2017 |
| KR | 2018-0067998 | A | 6/2018 |
| KR | 2018-1868277 | B1 | 7/2018 |
| KR | 2018-0136066 | A | 12/2018 |
| KR | 2021-0044421 | A | 4/2021 |
| KR | 2021-2337093 | B1 | 12/2021 |
| WO | WO 2022/260378 | A1 | 12/2022 |

OTHER PUBLICATIONS

Elago MS5 Charging Stand for MagSafe and Apple Watch Charger. Oct. 24, 2021. https://blog.naver.com/mchan21/222545129100.

Japan Patent Office, Office Action Issued in Application No. 2023-575692, Nov. 5, 2024, 8 pages. (Submitted with Machine Translation).

* cited by examiner

1000

1000'

1134  1141 1142  1650  1600  1700

1133

1130 (1131)

1100  1140

1130 (1132)

1160

1134

1200

1300

UP
RIGHT　　REAR
FRONT　　LEFT
DOWN

100

1600

2000

120

2300

1000

1300

UP

FRONT

RIGHT

LEFT

REAR

DOWN

CRADLE FOR MOUNTING SMART DEVICE AND BATTERY COUPLED THERETO

CROSS-REFERENCE TO RELATED APPLICATION

The present application is a U.S. national phase application under 35 U.S.C. 371 of International Application No. PCT/KR2022/007959, filed on Jun. 3, 2022, which claims the benefit of Korean Patent Application No. 10-2021-0075096 filed on Jun. 9, 2021 and Korean Patent Application No. 10-2021-0185811 filed on Dec. 23, 2021, both filed in the Korean Intellectual Property Office, the entire disclosure of each of which is incorporated herein by reference.

The present invention relates to a cradle for mounting a smart device and a battery coupled to the cradle.

BACKGROUND

In accordance with a recent trend toward non-face-to-face ordering together with the development of information and communication technology, restaurants and other stores are increasingly taking orders from customers by using smart devices such as tablet PCs. Generally, a tablet PC is placed for each table in restaurants and other stores, and a customer proceeds with logging in, registering coupons, ordering food, and paying for orders, watching a screen displayed on the tablet PC.

Examples of cases using tablet PCs in restaurants and other stores include a case in which tablet PCs are simply placed on tables, a case in which tablet PCs are simply placed on cradles, and a case in which tablet PCs are placed on cradles and the tablet devices are charged through the cradles at the same time. Among these cases, the case where tablet PCs mounted on cradles are charged through the cradles is the most convenient way, because one does not need to manually collect the tablet PCs from all the tables, charge the tablet PCs, and put the fully charged tablet PCs back on the tables.

However, in conventional cases where tablet PCs are charged through cradles, there are problems in that it is inconvenient to insert power plugs into all the cradles, and it is very difficult to manage power plugs because multiple power plugs are required to charge multiple tablet PCs.

The present invention has been made to solve the above-mentioned problems, and an object of the present invention is to provide a cradle for mounting a smart device and a battery coupled thereto capable of making it easier to charge the smart device than the conventional art.

However, the technical problems to be solved by the present invention are not limited to the above-mentioned problems, and other problems that are not mentioned can be clearly understood by those skilled in the art from the following description of the invention.

In one general aspect, a cradle for mounting a smart device includes: a device support portion supporting a rear side of the smart device; and a battery accommodating portion provided on the basis of the device support portion, and accommodating a battery capable of supplying power to the smart device through a device electrode portion provided in the smart device.

According to a first embodiment of the present invention, the cradle is premised on the assumption that the device electrode portion is provided on the rear side of the smart device. In this case, the device support portion may include a first device support portion disposed on the rear side of the smart device, and disposed on a left side of the device electrode portion with respect to the device electrode portion; and a second device support portion disposed on the rear side of the smart device, and disposed on a right side of the device electrode portion with respect to the device electrode portion.

The cradle may further include: a first rearward extension portion extending from at least a lower portion of an entire area of the first device support portion, and extending in a direction from a front side toward a rear side of the cradle; and a second rearward extension portion extending from at least a lower portion of an entire area of the second device support portion, and extending in the direction from the front side toward the rear side of the cradle.

The cradle may further include a battery lower-side support portion provided in such a manner as to connect the first rearward extension portion and the second rearward extension portion to each other, and supporting a lower side of the battery accommodated in the battery accommodating portion.

The cradle may further include a battery escape prevention portion extending upward of the cradle from a rear end located on the rear side of the cradle, among ends of the battery lower-side support portion, and preventing the battery accommodated in the battery accommodating portion from escaping.

An angle formed by the battery lower-side support portion and the battery escape prevention portion may be greater than or equal to 90° and smaller than 180°.

A groove may be provided in the battery escape prevention portion, starting from an upper side of the battery escape prevention portion in a direction toward a lower side of the battery escape prevention portion.

The cradle may further include: a first upper extension portion extending from at least an upper portion of an entire area of the first device support portion, and extending in a direction from a front side toward a rear side of the cradle; and a second upper extension portion extending from at least an upper portion of an entire area of the second device support portion, and extending in the direction from the front side toward the rear side of the cradle.

According to a second embodiment of the present invention as well, the cradle is premised on the assumption that the device electrode portion is provided on the rear side of the smart device. In this case, the device support portion may include: a device support body of which at least a partial portion is in contact with the rear side of the smart device; and a cradle front-side electrode portion provided on a front side of the device support body, and connected to the device electrode portion to supply power to the smart device.

The device support body may include: a smart device rear-side contact portion contacting the rear side of the smart device, with the cradle front-side electrode portion being provided therein; and a smart device rear-side non-contact portion located below the smart device rear-side contact portion, and recessed more than the smart device rear-side contact portion in a direction from a front side toward a rear side of the cradle, such that the smart device rear-side non-contact portion is not in contact with the rear side of the smart device.

The device support portion may further include a forward extension portion extending from at least a lower portion of an entire area of the device support body, and extending in a direction from a rear side toward a front side of the cradle.

The cradle may further include a rearward extension portion extending from at least a lower portion of an entire area of the device support body, and extending in a direction from a front side toward a rear side of the cradle.

The rearward extension portion may be configured to support a lower side of the battery accommodated in the battery accommodating portion.

The cradle may further include a cradle magnetic material disposed inside the device support body.

The cradle may further include an upper extension portion extending from at least an upper portion of an entire area of the device support body, and extending in a direction from a front side toward a rear side of the cradle.

The cradle front-side electrode portion may protrude from a front surface of the device support body in a direction from a rear side toward a front side of the cradle.

The cradle front-side electrode portion may be recessed from a front surface of the device support body in a direction from a front side toward a rear side of the cradle.

A first cradle protrusion may be provided on a front surface of the device support body, with the cradle front-side electrode portion as the center.

A first cradle groove may be provided on a front surface of the device support body, with the cradle front-side electrode portion as the center.

The device support portion may further include a cradle rear-side electrode portion provided on a rear side of the device support body, electrically connected to the cradle front-side electrode portion, and connected to a battery front-side electrode portion of the battery accommodated in the battery accommodating portion to supply power to the smart device.

The cradle rear-side electrode portion may be recessed from a rear surface of the device support body in a direction from a rear side toward a front side of the cradle.

The cradle rear-side electrode portion may protrude from a rear surface of the device support body in a direction from a front side toward a rear side of the cradle.

A second cradle groove may be provided on a rear surface of the device support body, with the cradle rear-side electrode portion as the center.

A second cradle protrusion may be provided on a rear surface of the device support body, with the cradle rear-side electrode portion as the center.

According to a third embodiment of the present invention, the cradle is premised on the assumption that the device electrode portion is provided at one end of the smart device. In this case, the device support portion may include: a device support body of which at least a partial portion is in contact with the rear side of the smart device; and a cradle lower-side electrode portion located on a lower side of the device support body, and connected to the device electrode portion to supply power to the smart device.

The device support body may include: a smart device rear-side contact portion contacting the rear side of the smart device; and a smart device rear-side non-contact portion located below the smart device rear-side contact portion, and recessed more than the smart device rear-side contact portion in a direction from a front side toward a rear side of the cradle, such that the smart device rear-side non-contact portion is not in contact with the rear side of the smart device.

The device support portion may further include a forward extension portion extending from at least a lower portion of an entire area of the device support body, and extending in a direction from a rear side toward a front side of the cradle, and the cradle lower-side electrode portion may be provided in the forward extension portion.

The cradle may further include a rearward extension portion extending from at least a lower portion of an entire area of the device support body, and extending in a direction from a front side toward a rear side of the cradle.

The rearward extension portion may be configured to support a lower side of the battery accommodated in the battery accommodating portion.

The cradle may further include a cradle magnetic material disposed inside the device support body.

The cradle may further include an upper extension portion extending from at least an upper portion of an entire area of the device support body, and extending in a direction from a front side toward a rear side of the cradle.

The device support portion may further include a cradle rear-side electrode portion provided on a rear side of the device support body, electrically connected to the cradle lower-side electrode portion, and connected to a battery front-side electrode portion of the battery accommodated in the battery accommodating portion to supply power to the smart device.

The cradle rear-side electrode portion may be recessed from a rear surface of the device support body in a direction from a rear side toward a front side of the cradle.

The cradle rear-side electrode portion may protrude from a rear surface of the device support body in a direction from a front side toward a rear side of the cradle.

A cradle groove may be provided on a rear surface of the device support body, with the cradle rear-side electrode portion as the center.

A cradle protrusion may be provided on a rear surface of the device support body, with the cradle rear-side electrode portion as the center.

In another general aspect, a battery includes: a battery body to be accommodated in the battery accommodating portion of the cradle; and a battery front-side electrode portion provided on a front side of the battery body, and connected to the device electrode portion to supply power to the smart device when the battery body is accommodated in the battery accommodating portion.

The battery may further include a battery magnetic material disposed inside the battery body.

The battery front-side electrode portion may protrude from a front surface of the battery body in a direction from a rear side toward a front side of the battery.

The battery front-side electrode portion may be recessed from a front surface of the battery body in a direction from a front side toward a rear side of the battery.

A first battery protrusion may be provided on a front surface of the battery body, with the battery front-side electrode portion as the center.

A first battery groove may be provided on a front surface of the battery body, with the battery front-side electrode portion as the center.

The battery may further include a battery rear-side electrode portion provided on a rear side of the battery body, and connected to an external electrode portion of an external charging device to supply power through the external charging device.

The battery rear-side electrode portion may be recessed from a rear surface of the battery body in a direction from a rear side toward a front side of the battery.

The battery rear-side electrode portion may protrude from a rear surface of the battery body in a direction from a front side toward a rear side of the battery.

A second battery groove may be provided on a rear surface of the battery body, with the battery rear-side electrode portion as the center.

A second battery protrusion may be provided on a rear surface of the battery body, with the battery rear-side electrode portion as the center.

Since the cradle according to the present invention includes a battery accommodating portion that accommodates a battery capable of supplying power to a smart device, the smart device can be charged with the battery accommodated in the battery accommodating portion. According to the present invention, it is possible to solve both the inconvenience in charging smart devices after inserting power plugs into all of the corresponding cradles of the charging smart devices and the inconvenience in managing multiple power plugs required to charge multiple smart devices. That is, according to the present invention, it is much easier to charge smart devices than the conventional art.

DETAILED DESCRIPTION

Figure 1A:
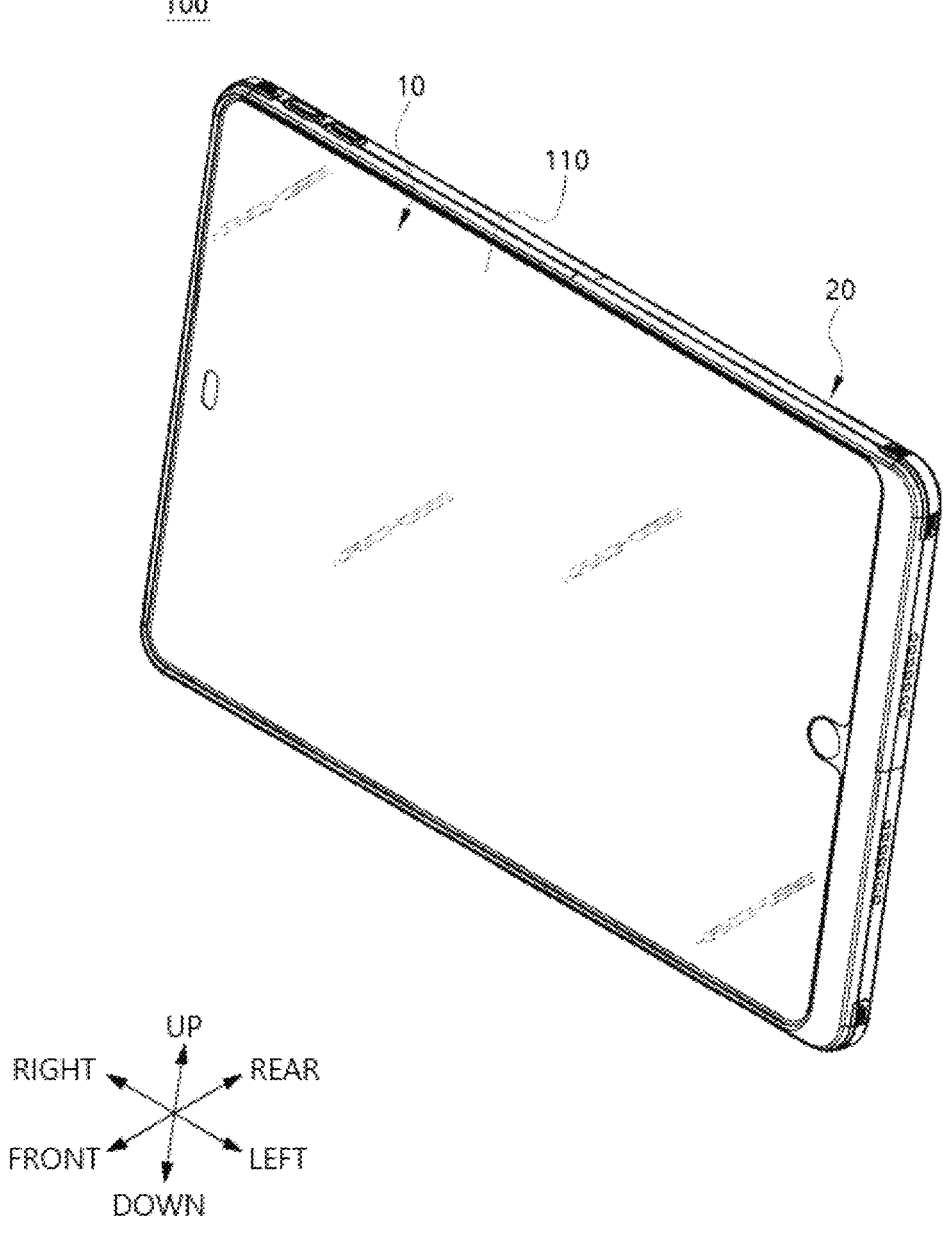
FIG. 1A is a front perspective view of an exemplary smart device.

Hereinafter, a cradle for mounting a smart device and a battery coupled thereto according to the present invention will be described in detail with reference to the accompanying drawings. The accompanying drawings are provided as examples in order to sufficiently convey the technical idea of the present invention to those skilled in the art, and the present invention is not limited to the drawings presented below and may be embodied in other forms. In the drawings, dotted lines are to indicate components (i.e., hidden components that are not visible from the outside) that exist inside a certain component, and alternate long and two short dashes lines are used to distinguish adjacent components from each other.

Cradles 1000, 1000', and 1000" to be described below are used to mount smart devices 100 and 100' thereon, and a battery 2000 is accommodated in a battery accommodating portion 1200 of each of the cradles 1000, 1000', and 1000" and is used to charge each of the smart devices 100 and 100'. Here, the smart devices 100 and 100', which are to be mounted on the cradles 1000, 1000', and 1000" and charged by the batteries 2000, refer to not only terminals such as tablet PCs and smartphones themselves, but also terminals such as tablet PCs and smartphones with jackets (i.e., protective cases) in which the terminals are housed.

Figure 1B:
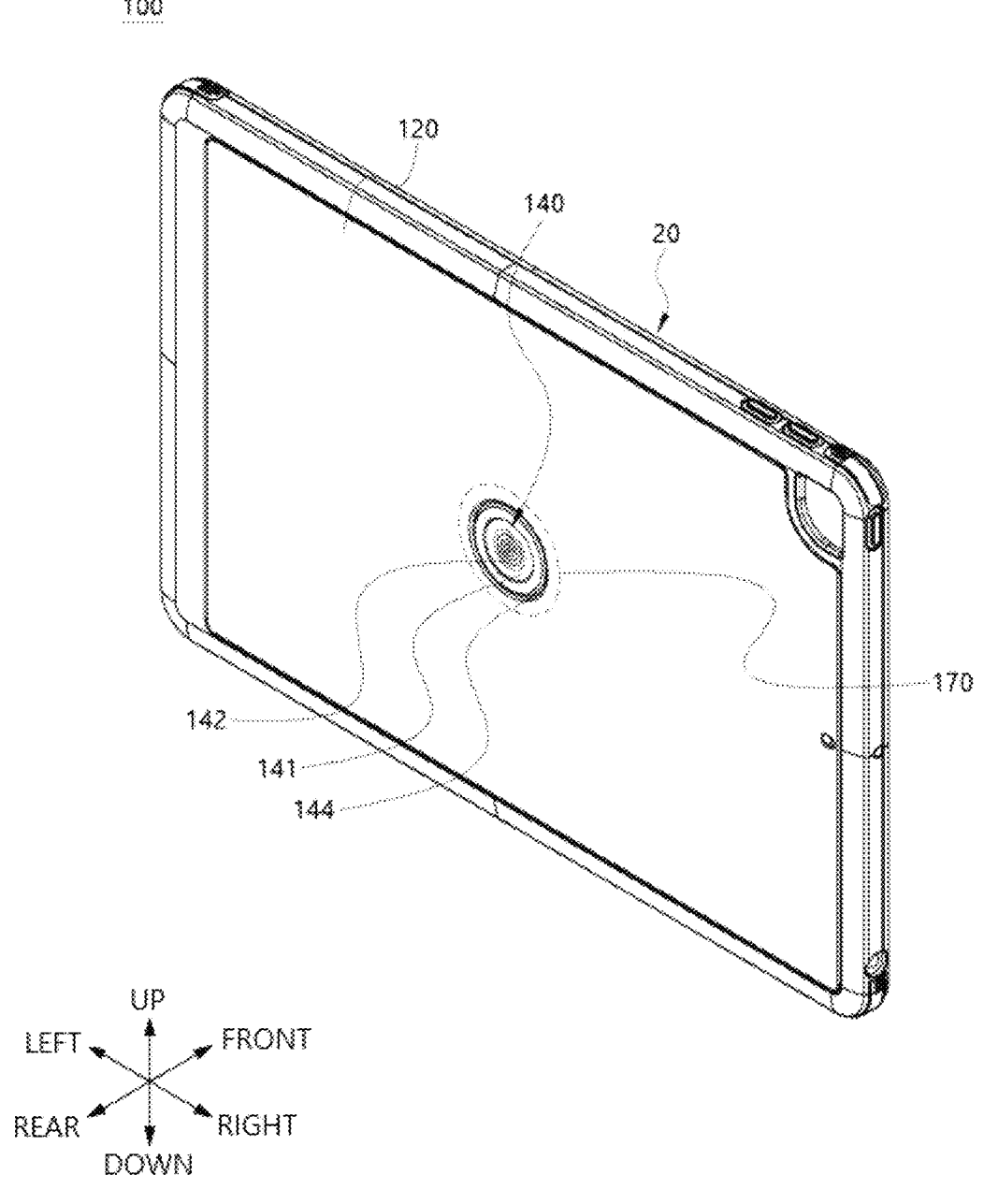
FIG. 1B is a rear perspective view of the smart device shown in FIG. 1A.

FIG. 1A is a front perspective view of an exemplary smart device 100, and FIG. 1B is a rear perspective view of the smart device 100 shown in FIG. 1A. In the smart device 100 shown in FIG. 1, a tablet PC 10 is coupled to a jacket 20.

The smart device 100 shown in FIG. 1 includes a device electrode portion 140 on a rear side (that is, a side where a rear surface 120 of the smart device 100 is located). The device electrode portion 140 may include a device electrode plate 141 and one or more device electrodes 142 disposed on the device electrode plate 141. The device electrodes 142 may be two or more ring-shaped unit electrodes arranged in the form of concentric circles. Alternatively, the device electrodes 142 may be two or more rectangular (or circular) unit electrodes arranged in one row or in two or more rows. The device electrode portion 140 may be provided in the jacket 20.

The device electrodes 142 may include power supply electrodes used to charge the smart device 100. Together with or separately from the power supply electrodes, the device electrodes 142 may include data communication electrodes that enable data communication of the smart device 100, such as updating software (or firmware) of the smart device 100, and/or identification (ID) electrodes for identifying the smart device 100.

The device electrode portion 140 may be recessed from the rear surface 120 of the smart device 100. More specifically, the device electrode portion 140 may be recessed from the rear surface 120 of the smart device 100 in a direction from the rear side (i.e., the side where the rear surface 120 of the smart device 100 is located) of the smart device 100 toward a front side (i.e., a side where a front surface 110 of the smart device 100 is located). Here, the device electrode portion 140 being recessed from the rear surface 120 of the smart device 100 means that both the device electrode plate 141 and the one or more device electrodes 142 constituting the device electrode portion 140 are located at a place recessed from the rear surface 120 of the smart device 100.

On the rear surface 120 of the smart device 100, a continuous or discontinuous circular device groove 144 may be provided around the device electrode portion 140 with the device electrode portion 140 as the center. Here, the device groove 144 may have a shape other than a circle, such as a square or a bar.

A device magnetic material 170 may be disposed inside the smart device 100. The device magnetic material 170 may be disposed inside the tablet PC 10 or inside the jacket 20. The magnetic material mentioned in the present invention refers to not only a magnet but also an object that can be magnetically coupled to the magnet.

The device magnetic material 170 may be magnetically coupled to a cradle magnetic material 1700, a battery magnetic material 2700, and a charging terminal magnetic material 3700, which will be described later. In a case where the smart device 100 is provided with the device magnetic material 170, and the cradle 1000' or 1000'', the battery 2000, and the charging terminal 3000, which will be described later, are provided with the magnetic materials 1700, and 2700, and 3700, the smart device 1000 can be coupled to the cradle 1000' or 1000'', the battery 2000, and the charging terminal 3000 in a relatively easy and stable manner by magnetic coupling between the magnetic materials, and the device electrode 142 can be electrically connected to electrodes 1142, 2220, and 3220, which will be described later, in a relatively reliable manner.

Figure 2A:
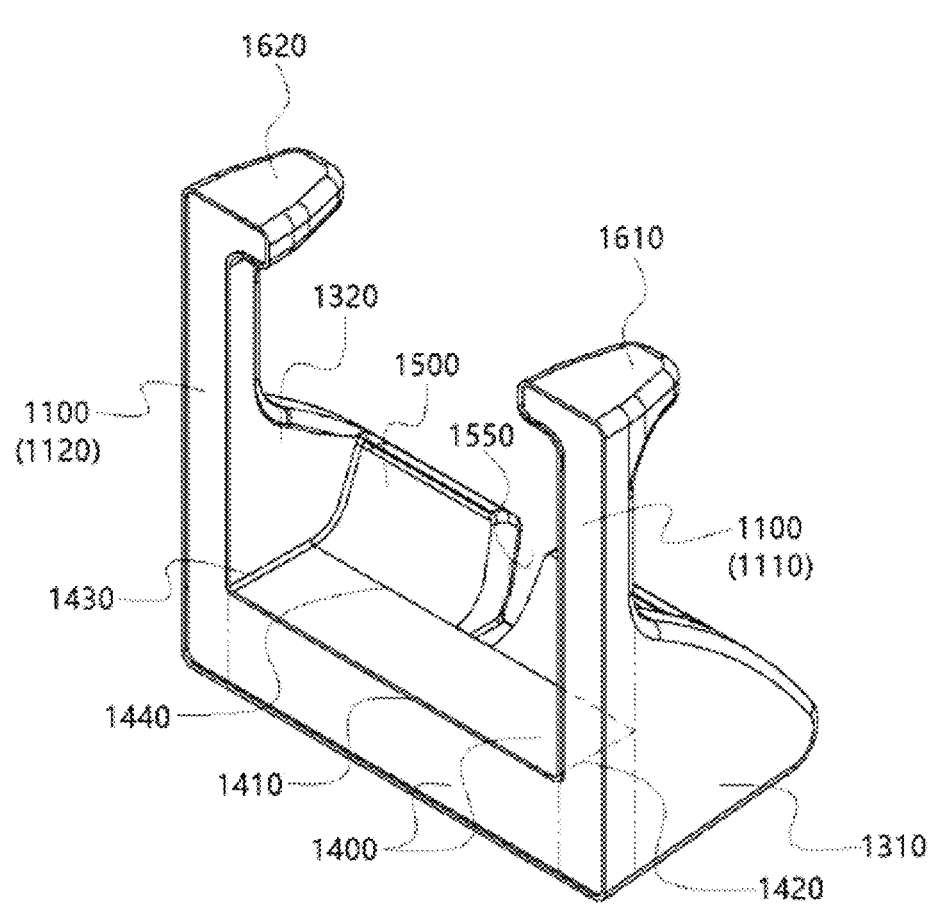
FIG. 2A is a front perspective view of a cradle for mounting a smart device according to a first embodiment of the present invention.
Figure 2A:
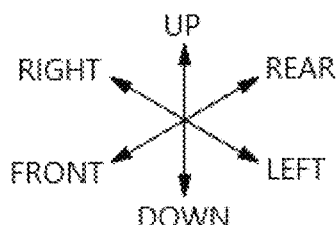
Figure 2B:
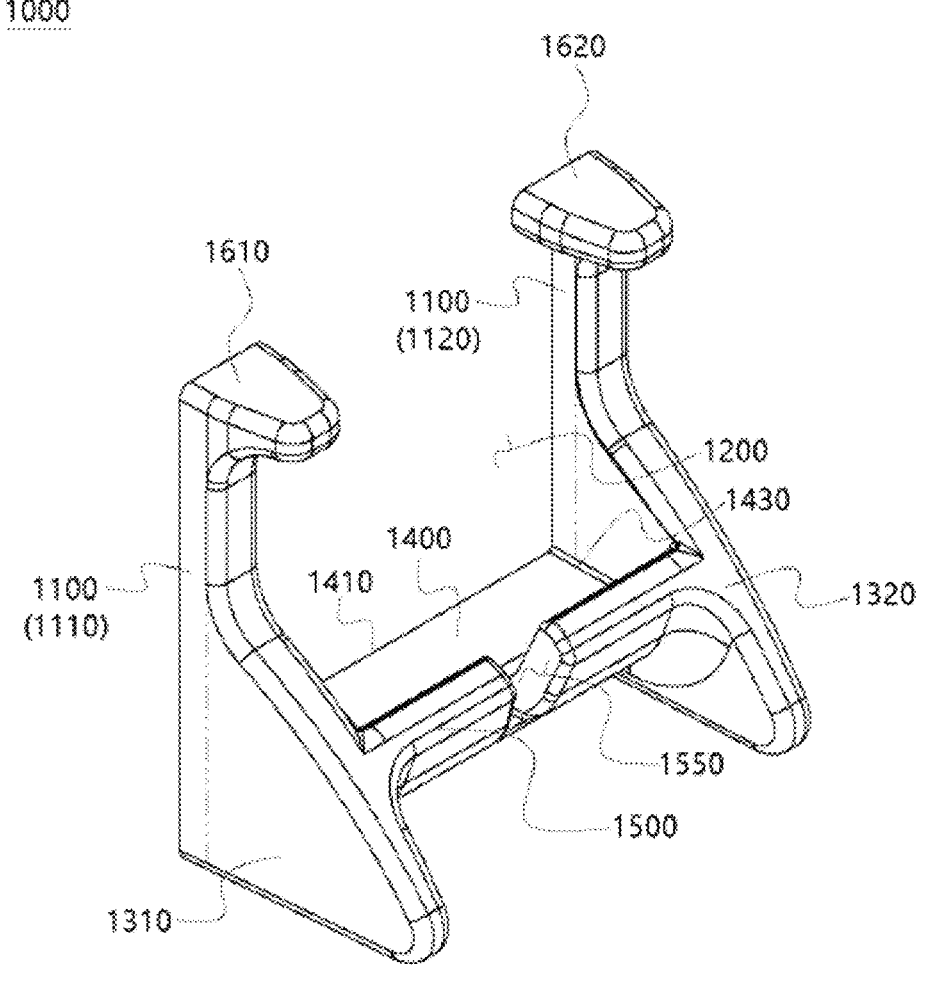
FIG. 2B is a rear perspective view of the cradle shown in FIG. 2A.
Figure 2B:
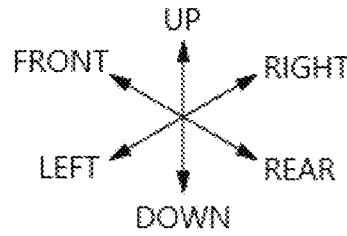
Figure 3:
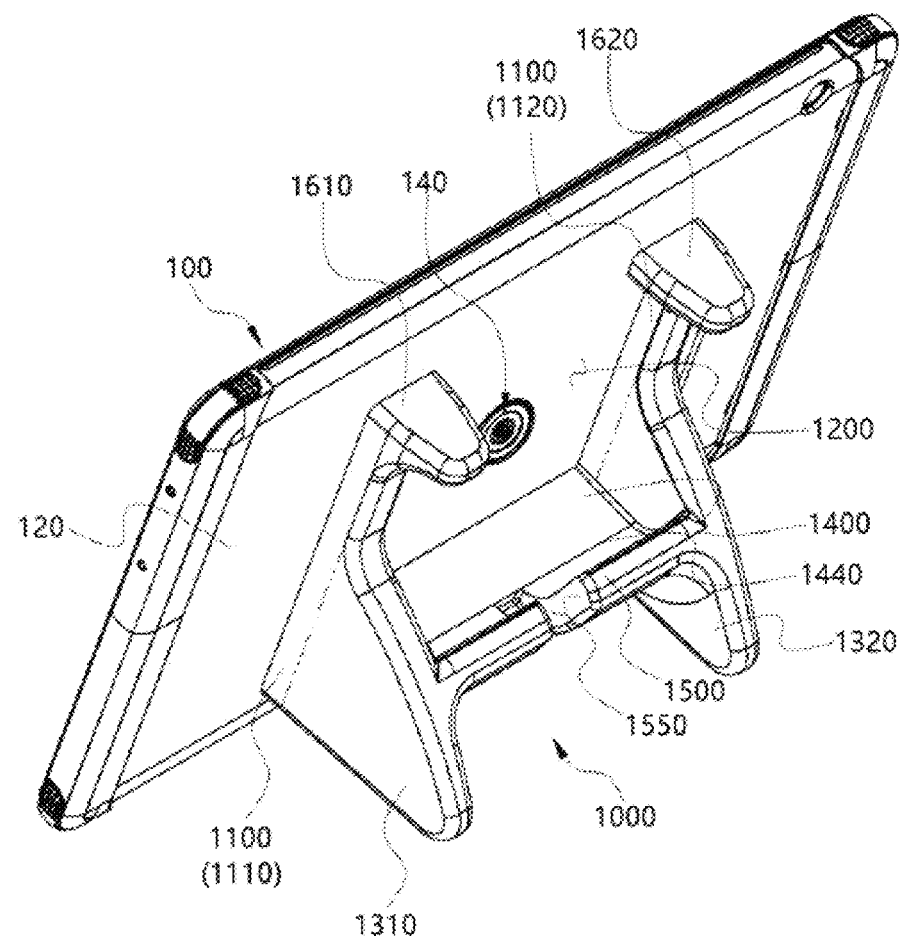
FIG. 3 is a view showing a state where the cradle of FIG. 2 is coupled to the smart device of FIG. 1.
Figure 3:
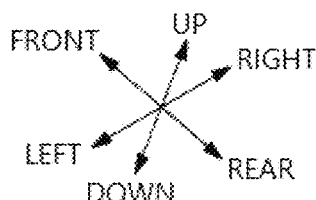

FIG. 2A is a front perspective view of a cradle 1000 for mounting a smart device according to a first embodiment of the present invention, and FIG. 2B is a rear perspective view of the cradle 1000 shown in FIG. 2A. FIG. 3 is a view showing a state where the cradle 1000 of FIG. 2 is coupled to the smart device 100 of FIG. 1.

As shown in FIGS. 2 and 3, the cradle 1000 according to the first embodiment of the present invention may include a device support portion 1100 and a battery accommodating portion 1200, and may further include one or more of a first rearward extension portion 1310, a second rearward extension portion 1320, a battery lower-side support portion 1400, a battery escape prevention portion 1500, and a first upper extension portion 1610, and a second upper extension portion 1620.

The device support portion 1100 supports the rear side of the smart device 100 as one surface of the device support portion 1100 contacts the rear surface 120 of the smart device 100.

The battery accommodating portion 1200 is provided on the basis of the device support portion 1100, and accommodates a battery 2000 capable of supplying power to the smart device 100 through the device electrode portion 140 provided in the smart device 100.

As described above, in the smart device 100 of FIG. 1, the device electrode portion 140 is provided on the rear side of the smart device 100. In this case, the device support portion 1100 according to the first embodiment of the present invention may include a first device support portion 1110 and a second device support portion 1120.

As shown in FIG. 3, when the cradle 1000 mounts the smart device 100 thereon, the first device support portion 1110 may be disposed on the rear side of the smart device 100, and may be disposed on a left side of the device electrode portion 140 with respect to the device electrode portion 140. The first device support portion 1110 may be shaped like a rod extending in the up-down direction.

In addition, when the cradle 1000 mounts the smart device 100 thereon, the second device support portion 1120 may be disposed on the rear side of the smart device 100, and may be disposed on a right side of the device electrode portion 140 with respect to the device electrode portion 140. The second device support portion 1120 may also be shaped like a rod extending in the up-down direction. The second device support portion 1120 may be located at a certain distance from the first device support portion 1110 in the right direction. One surface of the first device support portion 1110 and one surface of the second device support portion 1110 support the rear side of the smart device 100 by directly contacting the rear surface of the smart device 100.

Since the first device support portion 1110 and the second device support portion 1120 support the rear side of the smart device 100 on the left and right sides, respectively, with respect to the device electrode portion 140 as described above, the smart device 100 can be supported stably.

The first rearward extension portion 1310 extends from at least a lower portion of the entire area of the first device support portion 1110, and extends in a direction from the front side toward the rear side of the cradle 1000. Here, the lower portion of the first device support portion 1110 refers to a portion below the center of the first device support portion 1110 in the up-down direction.

In addition, the second rearward extension portion 1320 extends from at least a lower portion of the entire area of the second device support portion 1120, and extends in the direction from the front side toward the rear side of the cradle 1000. Here, the lower portion of the second device support portion 1120 refers to a portion below the center of the second device support portion 1120 in the up-down direction.

These rearward extension portions 1310 and 1320 contribute to stably mounting the smart device 100 by expanding an area where the cradle 1000 is in contact with the ground (see FIG. 2), or enabling the cradle 1000 to mount the smart device 100 thereon at a certain angle with respect to the ground (see FIG. 3).

The battery lower-side support portion 1400 is provided between the first rearward extension portion 1310 and the second rearward extension portion 1320. More specifically, the battery lower-side support portion 1400 is provided in such a manner as to connect the first rearward extension portion 1310 and the second rearward extension portion 1320 to each other. In addition, the battery lower-side support portion 1400 serves to support a lower side of a battery 2000 accommodated in the battery accommodating portion 1200. To this end, the battery lower-side support portion 1400 may be formed in a rectangular plate shape.

Together with the first device support portion 1110 and the second device support portion 1120, the battery lower-side support portion 1400 forms the battery accommodating portion 1200. That is, the first device support portion 1110 forms a left border of the battery accommodating portion 1200, the second device support portion 1120 forms a right border of the battery accommodating portion 1200, and the battery lower-side support portion 1400 forms a lower border of the battery accommodating portion 1200. Furthermore, the battery escape prevention portion 1500, which will be described later, forms a rear border of the battery accommodating portion 1200, and the first upper extension portion 1610 and the second upper extension portion 1620 form an upper border of the battery accommodating portion 1200.

The battery lower-side support portion 1400 may have a front end 1410, a left end 1420, a right end 1430, and a rear end 1440. The front end 1410 is an end located on the front side of the cradle 1000 among the ends of the battery lower-side support portion 1400. When the device support portion 1100 supports the rear side of the smart device 100, the front end 1410 may contact the rear surface 120 of the smart device 100. The left end 1420 is an end located on the left side among the ends of the battery lower-side support portion 1400, and the right end 1430 is an end located on the right side among the ends of the battery lower-side support portion 1400. The left end 1420 may be in contact with the first rearward extension portion 1310, and the right end 1430 may be in contact with the second rearward extension portion 1320. The rear end 1440 is an end located on the rear side of the cradle 1000 among the ends of the battery lower-side support portion 1400, and may be in contact with the battery escape prevention portion 1500, which will be described later.

The battery escape prevention portion 1500 extends upward of the cradle 1000 from the rear end 1440 of the battery lower-side support portion 1400, and serves to prevent the battery 2000 accommodated in the battery accommodating portion 1200 from escaping in the direction from the front side toward the rear side of the cradle 1000.

The first upper extension portion 1610 extends from at least an upper portion of the entire area of the first device support portion 1110, and extends in the direction from the front side toward the rear side of the cradle 1000. Here, the upper portion of the first device support portion 1110 refers to a portion above the center of the first device support portion 1110 in the up-down direction.

The second upper extension portion 1620 extends from at least an upper portion of the entire area of the second device support portion 1120, and extends in the direction from the front side toward the rear side of the cradle 1000. Here, the upper portion of the second device support portion 1120 refers to a portion above the center of the second device support portion 1120 in the up-down direction.

These upper extension portions 1610 and 1620 form an upper border of the battery accommodating portion 1200, and serve to prevent the battery 2000 accommodated in the battery accommodating portion 1200 from escaping in a direction from the lower side toward the upper side of the cradle 1000. In addition, since the first upper extension portion 1610 and the second upper extension portion 1620 are spaced apart from each other by a certain distance, it is possible to easily check a remaining amount of power stored in the battery 2000 through a remaining amount display unit 2800 of the battery 2000 accommodated in the battery accommodating portion 1200.

Figure 4A:
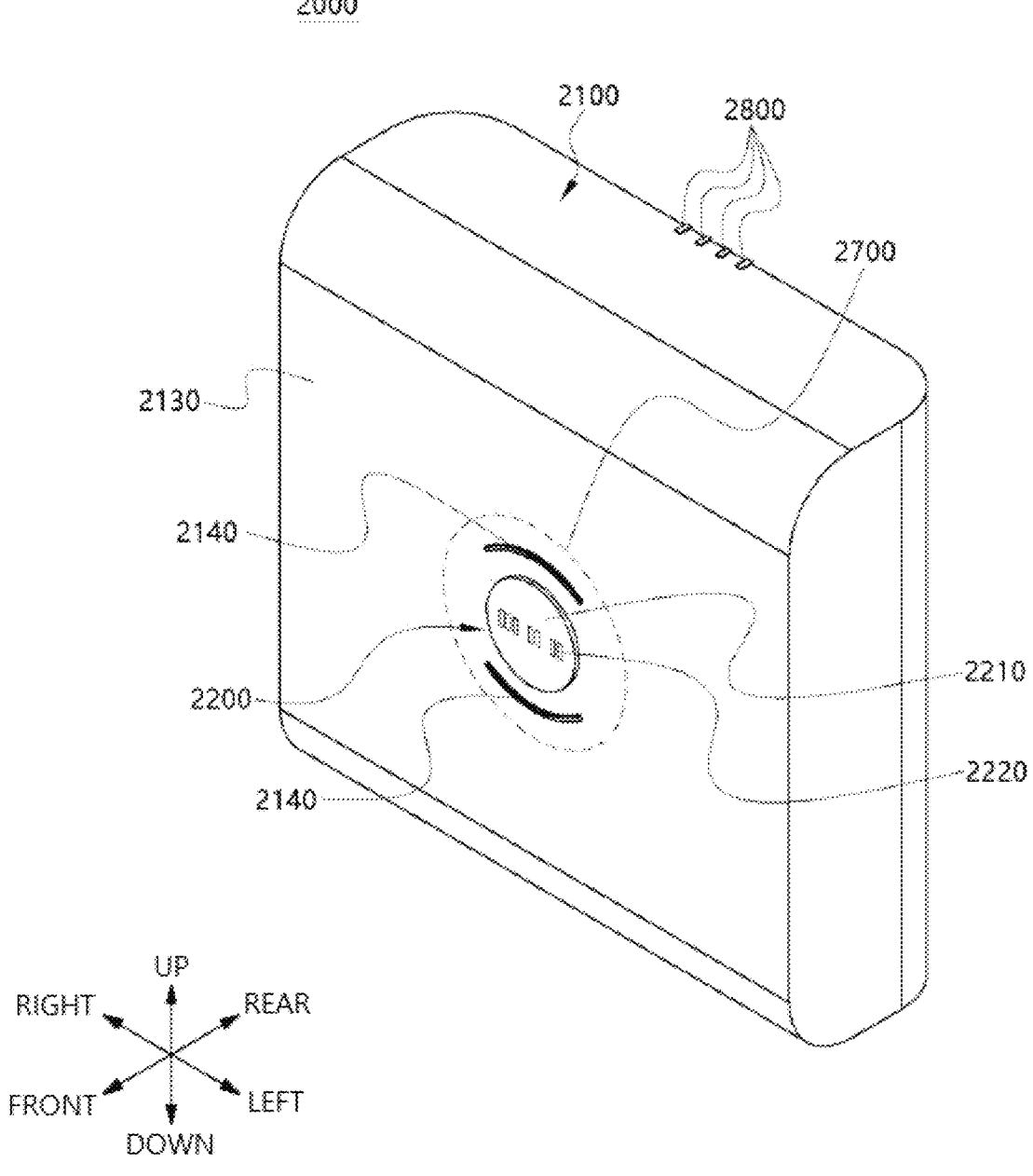
FIG. 4A is a front perspective view of a battery according to an embodiment of the present invention.
Figure 4B:
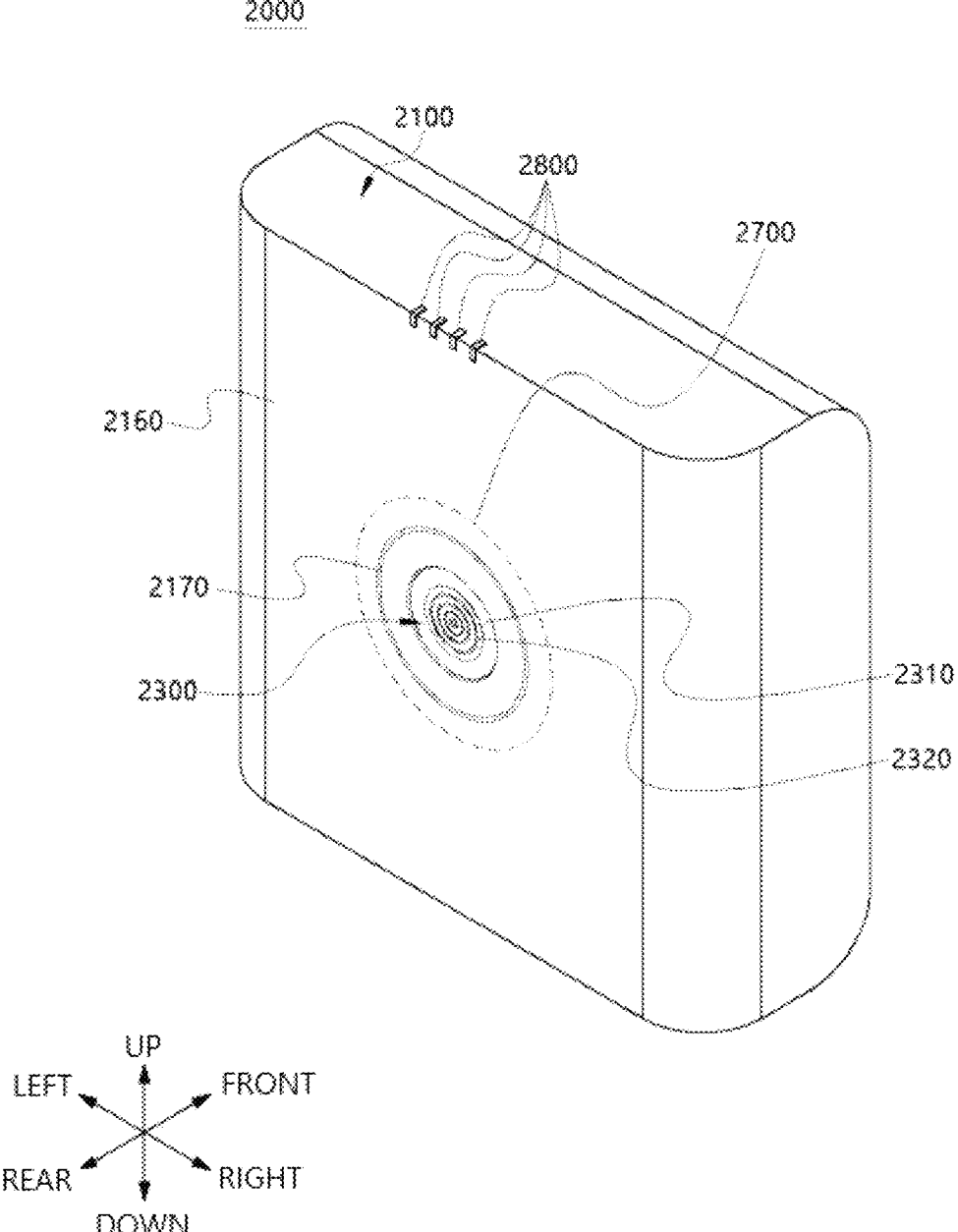
FIG. 4B is a rear perspective view of the battery shown in FIG. 4A.

Meanwhile, FIG. 4A is a front perspective view of a battery 2000 according to an embodiment of the present invention, and FIG. 4B is a rear perspective view of the battery 2000 shown in FIG. 4A. As shown in FIG. 4, the battery 2000 according to an embodiment of the present invention includes a battery body 2100 and a battery front-side electrode portion 2200, and may further include a battery rear-side electrode portion 2300.

The battery body 2100 may have a substantially rectangular parallelepiped shape and is accommodated in the battery accommodating portion 1200 of the cradle 1000.

The battery front-side electrode portion 2200 is provided on a front side of the battery body 2100. When the battery body 2100 is accommodated in the battery accommodating portion 1200, the battery front-side electrode portion 2200 is connected to the device electrode portion 140 and serves to supply power to the smart device 100.

The battery front-side electrode portion 2200 may include a battery front-side electrode plate 2210 and one or more battery front-side electrodes 2220 disposed on the battery front electrode plate 2210. The battery front-side electrodes 2220 may be two or more rectangular (or circular) unit electrodes arranged in one row or in two or more rows. Alternatively, the battery front-side electrodes 2220 may be two or more ring-shaped unit electrodes arranged in the form of concentric circles. The battery front-side electrodes 2220 may include power supply electrodes used to charge the smart device 100.

As described above with reference to FIG. 1, the device electrode portion 140 may be recessed from the rear surface 120 of the smart device 100. In this regard, the battery front-side electrode portion 2200 may protrude from a front surface 2130 of the battery body 2100 in a direction from the rear side toward the front side of the battery 2000, as shown in FIG. 4A.

In a case where the battery front-side electrode portion 2200 protrudes from the front surface 2130 of the battery body 2100 with respect to the device electrode portion 140 recessed from the rear surface 120 of the smart device 100 as described above, mechanical coupling can be made between the device electrode portion 140 and the battery front-side electrode portion 2200, thereby easily achieving electrical connection between the device electrodes 142 and the battery front-side electrodes 2220.

In addition, as a result of the mechanical coupling between the device electrode portion 140 and the battery front-side electrode portion 2200, matching between the device electrodes 142 and the battery front-side electrodes 2220 can be achieved. Accordingly, short circuits between the device electrodes 142 and the battery front-side electrodes 2220 can be prevented, enabling more stable electrical connection between the electrodes 142 and 2220.

A battery magnetic material 2700 be may disposed inside the battery body 2100. The battery magnetic material 2700 may be magnetically coupled to the device magnetic material 170, a cradle magnetic material 1700, and a charging terminal magnetic material 3700, which will be described later. In a case where the battery magnetic material 2700 is included in the battery 2000 as described above, the battery 2000 and the smart device 100 are magnetically coupled to each other, the battery 2000 and the cradle 1000' or 1000" are magnetically coupled to each other, and the battery 2000 and the charging terminal 3000 are magnetically coupled to each other. Therefore, the battery 2000 can be more easily and reliably coupled to the smart device 100, the cradle 1000' or 1000", and the charging terminal 3000, and furthermore, electrical connection between the battery front-side electrodes 2220 and the device electrodes 142 (or cradle rear-side electrodes 1152) can be realized in a relatively reliable manner.

As described above with reference to FIG. 1, the device groove 144 may be provided around the device electrode portion 140 on the rear surface 120 of the smart device 100, with the device electrode portion 140 as the center. In this regard, a first battery protrusion 2140 that is discontinuously or continuously circular may be provided around the battery front-side electrode portion 2200 on the front surface 2130 of the battery body 2100, with the battery front-side electrode portion 2200 as the center. Here, the first battery protrusion 2140 may have a shape other than a circle, such as a square or a bar.

The first battery protrusion 2140 may be mechanically coupled to the device groove 144 of the smart device 100 shown in FIG. 1B. When the mechanical coupling between the first battery protrusion 2140 and the device groove 144 is achieved together with or separately from the magnetic coupling between the battery magnetic material 2700 and the device magnetic material 170 described above, the battery 2000 can be stably coupled to the smart device 100, enabling stable electrical connection between the battery front-side electrodes 2220 and the device electrodes 142. In particular, in a case where first battery protrusions 2140 are provided symmetrically around the battery front-side electrode portion 2200, stable mechanical coupling can be achieved between the first battery protrusions 2140 and the device grooves 144, and accordingly, electrical connection between the battery front-side electrodes 2220 and the device electrodes 142 can be made in a relatively stable manner.

Figure 5:
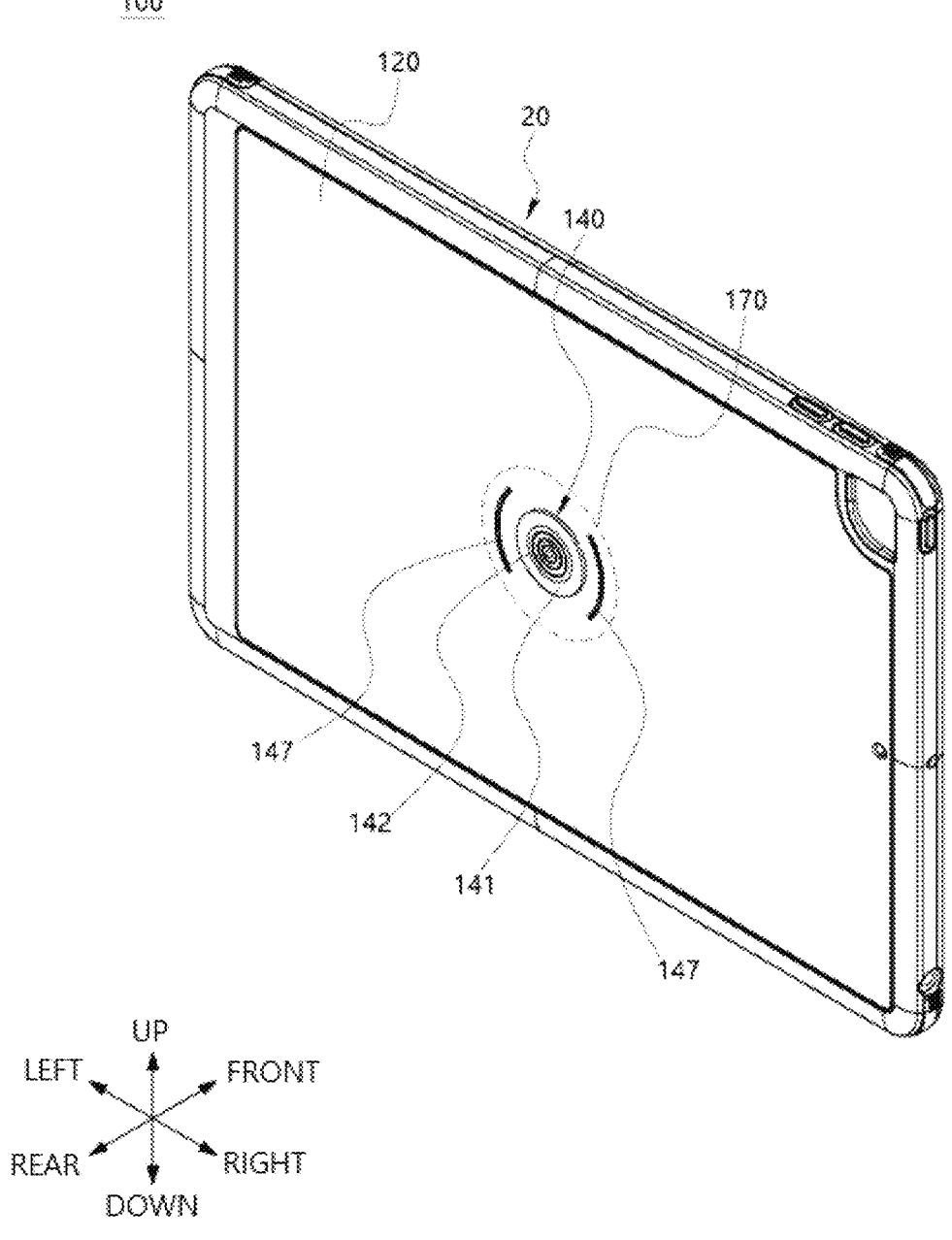
FIG. 5 is a modification of the rear perspective view of the smart device shown in FIG. 1B.

FIG. 5 is a modification of the rear perspective view of the smart device shown in FIG. 1B.

The device electrode portion 140 shown in FIG. 5 protrudes from the rear surface 120 of the smart device 100. More specifically, the device electrode portion 140 protrudes from the rear surface 120 of the smart device 100 in a direction from the front side toward the rear side of the smart device 100. Here, the protrusion of the device electrode portion 140 from the rear surface 120 of the smart device 100 means that all of the device electrode plate 141 and the one or more device electrodes 142 constituting the device electrode portion 140 of the smart device 100 are located at a place protruding from the rear surface 120 of the smart device 100.

With respect to the device electrode portion 140 protruding from the rear surface 120 of the smart device 100 as shown in FIG. 5, the battery front-side electrode portion 2200 of the battery 2000 may be recessed from the front surface 2130 of the battery body 2100 in a direction from the front side toward the rear side of the battery 2000. Although FIG. 4B shows the battery rear-side electrode portion 2300, the battery front-side electrode portion 2200 is recessed from the front surface 2130 of the battery body 2100 in the same manner as the battery rear-side electrode portion 2300 recessed from a rear surface 2160 of the battery body 2100 as shown in FIG. 4B.

In a where case the battery front-side electrode portion 2200 is recessed from the front surface 2130 of the battery body 2100 with respect to the device electrode portion 140 protruding from the rear surface 120 of the smart device 100 as shown in FIG. 5, mechanical coupling can be made between the device electrode portion 140 and the battery front-side electrode portion 2200, thereby easily achieving electrical connection between the device electrodes 142 and the battery front-side electrodes 2220.

In addition, as a result of the mechanical coupling between the device electrode portion 140 and the battery front-side electrode portion 2200, matching between the device electrodes 142 and the battery front-side electrodes 2220 can be achieved. Accordingly, short circuits between the device electrodes 142 and the battery front-side electrodes 2220 can be prevented, enabling more stable electrical connection between the electrodes 142 and 2220.

In addition, as shown in FIG. 5, a device protrusion 147 that is discontinuously or continuously circular may be provided around the device electrode portion 140 on the rear surface 120 of the smart device 100, with the device electrode portion 140 as the center. Here, the device protrusion 147 may have a shape other than a circle, such as a square or a bar.

As shown in FIG. 5, with respect to the device protrusion 147 provided on the rear surface 120 of the smart device 100, a first battery groove that is continuously or discontinuously circular may be provided around the battery front-side electrode portion 2200 on the front surface 2130 of the battery body 2100, with the battery front-side electrode portion 2200 as the center. Here, the first battery groove may have a shape other than a circle, such as a square or a bar. Although FIG. 4B shows the second battery groove 2170 provided around the battery rear-side electrode portion 2300, the first battery groove may be provided on the front surface 2130 of the battery body 2100 at the same position and in the same manner as the second battery groove 2170 shown in FIG. 4B.

The first battery groove can be mechanically coupled to the device protrusion 147 of the smart device 100 shown in FIG. 5. When the mechanical coupling between the first battery groove and the device protrusion 147 is achieved together with or separately from the magnetic coupling between the battery magnetic material 2700 and the device magnetic material 170 described above, the battery 2000 can be stably coupled to the smart device 100, enabling stable electrical connection between the battery front-side electrodes 2220 and the device electrodes 142. In particular, in a case where first battery grooves are provided symmetrically the around battery front-side electrode portion 2200, stable mechanical coupling can be achieved between the first battery grooves and the device protrusions 147, and accordingly, electrical connection between the battery front-side electrodes 2220 and the device electrodes 142 can be made in a relatively stable manner.

Meanwhile, the battery rear-side electrode portion 2300 shown in FIG. 4B may be provided on a rear side of the battery body 2100, and may be electrically connected to the battery front-side electrode portion 2200.

In a state where the battery body 2100 is accommodated in the battery accommodating portion 1200, the battery rear-side electrode portion 2300 may be connected to an external electrode portion (e.g., a terminal electrode portion 3200 to be described later) of an external charging device (e.g., a charging terminal 3000 to be described later) to supply power through the external charging device.

The power supplied through the external charging device may be used to charge the smart device 100 mounted on the cradle 1000, after passing through the external electrode portion (e.g., the terminal electrode portion 3200 to be described later), the battery rear-side electrode portion 2300, the battery front-side electrode portion 2200, and the device electrode portion 140 (see FIG. 6B).

Figure 10A:
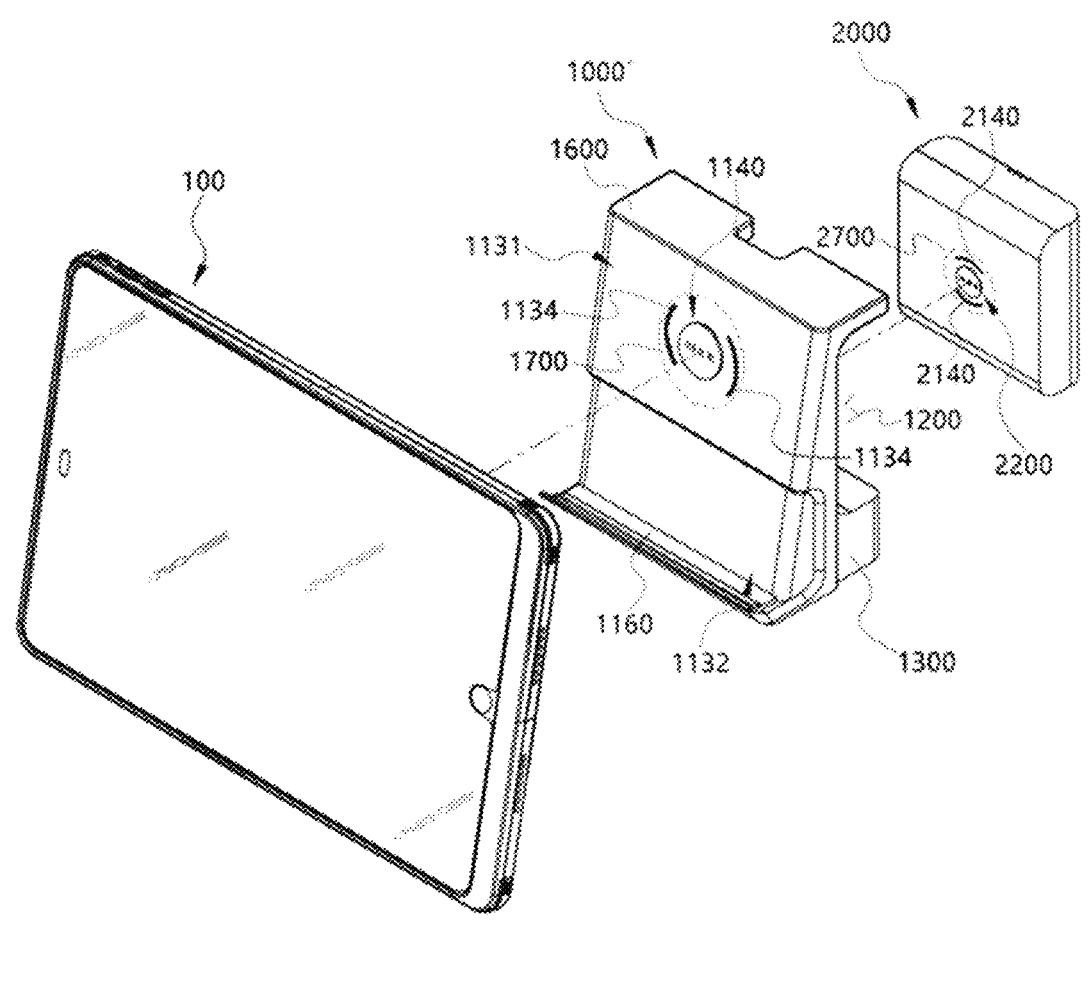
FIG. 10A is a view showing a state before the smart device of FIG. 1, the cradle of FIG. 9, and the battery of FIG. 4 are connected to each other.
Figure 10B:
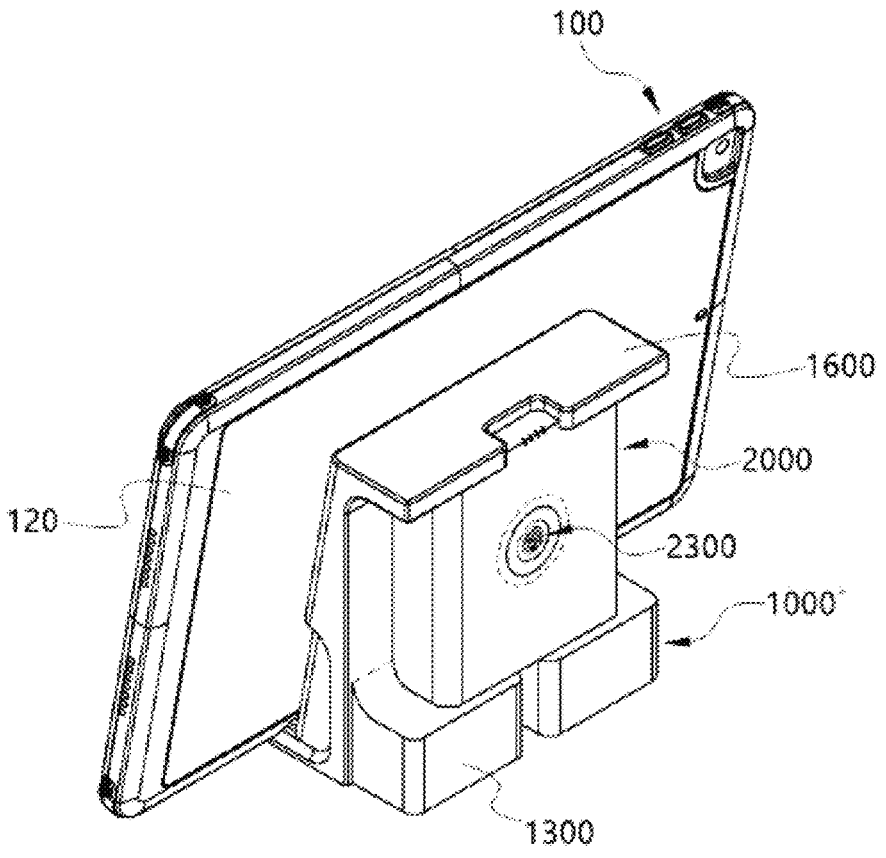
FIG. 10B is a view showing a state in which the smart device of FIG. 1, the cradle of FIG. 9, and the battery of FIG. 4 are connected to each other.

Alternatively, the power supplied through the external charging device may be used to charge the smart device 100 mounted on the cradle 1000, after passing through an external electrode portion (e.g., a terminal electrode portion 3200 to be described later), the battery rear-side electrode portion 2300, the battery front-side electrode portion 2200, a cradle rear-side electrode portion 1150, a cradle front-side electrode portion 1140, and the device electrode portion 140 (see FIG. 10B).

Even in a state where the battery body 2100 is not accommodated in the battery accommodating portion 1200, the battery rear-side electrode portion 2300 may be connected to an external electrode portion (e.g., a terminal electrode portion 3200 to be described later) of an external charging device (e.g., a charging terminal 3000 to be described later) to supply power through the external charging device, and the power supplied through the external charging device is stored in the battery 2000.

The battery rear-side electrode portion 2300 may include a battery rear-side electrode plate 2310 and one or more battery rear-side electrodes 2320 disposed on the battery rear-side electrode plate 2310. The battery rear-side electrodes 2320 may be two or more ring-shaped unit electrodes arranged in the form of concentric circles. Alternatively, the battery rear-side electrodes 2320 may be two or more rectangular (or circular) unit electrodes arranged in one row or in two or more rows. The battery rear-side electrodes 2320 include may power supply electrodes used to supply power through an external charging device.

The battery rear-side electrode portion 2300 may be recessed from the rear surface 2160 of the battery body 2100 in the direction from the rear side toward the front side of the battery 2000.

In a case where the battery rear-side electrode portion 2300 is recessed from the rear surface 2160 of the battery body 2100 as described above, the battery rear-side electrode portion 2300 can be mechanically coupled to a terminal electrode portion 3200 protruding from a front surface 3130 of a terminal body 3100 as will be described later, thereby easily achieving electrical connection between the battery rear-side electrodes 2320 and terminal electrodes 3220.

In addition, as a result of the mechanical coupling between the battery rear-side electrodes 2320 and the terminal electrodes 3220, matching between the battery rear-side electrodes 2320 and the terminal electrodes 3220 can be achieved. Accordingly, short circuits between the battery rear-side electrodes 2320 and the terminal electrodes 3220 can be prevented, enabling more stable electrical connection between the electrodes 2320 and 3220.

Alternatively, the battery rear-side electrode portion 2300 may protrude from the rear surface 2160 of the battery body 2100 in the direction from the front side toward the rear side of the battery 2000. Although FIG. 4A shows the battery front-side electrode portion 2200, the battery rear-side electrode portion 2300 protrudes from the rear surface 2160 of the battery body 2100 in the same manner as the battery front-side electrode portion 2200 protruding from the front surface 2130 of the battery body 2100 in FIG. 4A.

In a case where the battery rear-side electrode portion 2300 protrudes from the rear surface 2160 of the battery body 2100 as described above, the battery rear-side electrode portion 2300 can be mechanically coupled to the terminal electrode portion 3200 recessed from the front surface 3130 of the terminal body 3100 (corresponding to a modification of FIG. 7 to be described later, the terminal electrode portion 3200 is recessed in the same manner as, for example, the battery rear-side electrode portion 2300 recessed from the rear surface 2160 of the battery body 2100 in FIG. 4B), thereby easily achieving electrical connection between the battery rear-side electrodes 2320 and terminal electrodes 3220.

In addition, as a result of the mechanical coupling between the battery rear-side electrodes 2320 and the terminal electrodes 3220, matching between the battery rear-side electrodes 2320 and the terminal electrodes 3220 can be achieved. Accordingly, short circuits between the battery rear-side electrodes 2320 and the terminal electrodes 3220 can be prevented, enabling more stable electrical connection between the electrodes 2320 and 3220.

As shown in FIG. 4B, a second battery groove 2170 that is continuously or discontinuously circular may be provided around the battery rear-side electrode portion 2300 on the rear surface 2160 of the battery body 2100, with the battery rear-side electrode portion 2300 as the center. Here, the second battery groove 2170 may have a shape other than a circle, such as a square or a bar.

The second battery groove 2170 may be mechanically coupled to a terminal protrusion 3140 of the charging terminal 3000, as will be described later. When the mechanical coupling between the second battery groove 2170 and the terminal protrusion 3140 is achieved together with or separately from the magnetic coupling between the battery magnetic material 2700 and the terminal magnetic material 3700 described above, the battery 2000 can be stably coupled to the charging terminal 300, enabling stable electrical connection between the battery rear-side electrodes 2320 and the terminal electrodes 3220. In particular, in a case where second battery grooves 2170 are provided symmetrically around the battery rear-side electrode portion 2300, stable mechanical coupling can be achieved between the second battery grooves 2170 and the terminal protrusions 3140, and accordingly, electrical connection between the battery rear-side electrodes 2320 and the terminal electrodes 3220 can be made in a relatively stable manner.

Alternatively, a second battery protrusion that is discontinuously or continuously circular may be provided around the battery rear-side electrode portion 2300 on the rear surface 2160 of the battery body 2100, with the battery rear-side electrode portion 2300 as the center. Here, the second battery protrusion may have a shape other than a circle, such as a square or a bar. Although FIG. 4A shows the first battery protrusion 2140 provided around the battery front-side electrode portion 2200, the second battery protrusion may be provided on the rear surface 2160 of the battery body 2100 at the same position and in the same manner as the first battery protrusion 2140 shown in FIG. 4A.

The second battery protrusion may be mechanically coupled to a terminal groove provided around the terminal electrode portion 3200 (corresponding to a modification of FIG. 7 to be described later, the terminal groove is formed in the same manner as, for example, the second battery groove 2170 provided around the battery rear-side electrode portion 2300 in FIG. 4B), with the terminal electrode portion 3200 as the center. When the mechanical coupling between the second battery protrusion and the terminal groove is achieved together with or separately from the magnetic coupling between the battery magnetic material 2700 and the terminal magnetic material 3700 described above, the battery 2000 can be stably coupled to the charging terminal 3000, enabling stable electrical connection between the battery rear-side electrodes 2320 and the terminal electrodes 3220. In particular, in a case where second battery protrusions are provided symmetrically around the battery rear-side electrode portion 2300, stable mechanical coupling can be achieved between the second battery protrusions and the terminal grooves, and accordingly, electrical connection between the battery rear-side electrodes 2320 and the terminal electrodes 3220 can be made in a relatively stable manner.

Figure 6A:
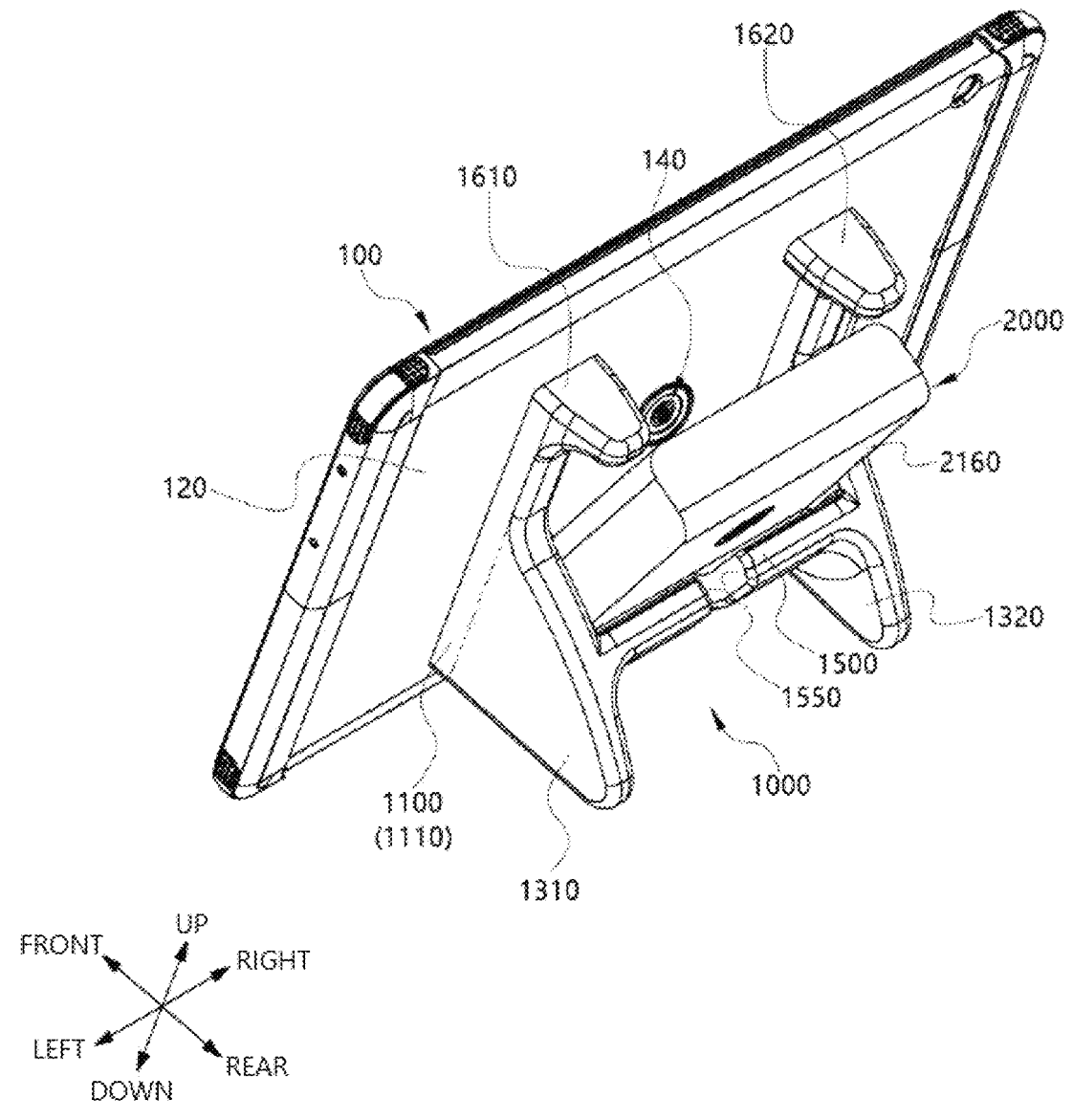
FIG. 6A is a view showing a state before a device electrode portion and a battery front-side electrode portion connected to each other while the battery of FIG. 4 is accommodated in the battery accommodating portion of FIG. 3.
Figure 6B:
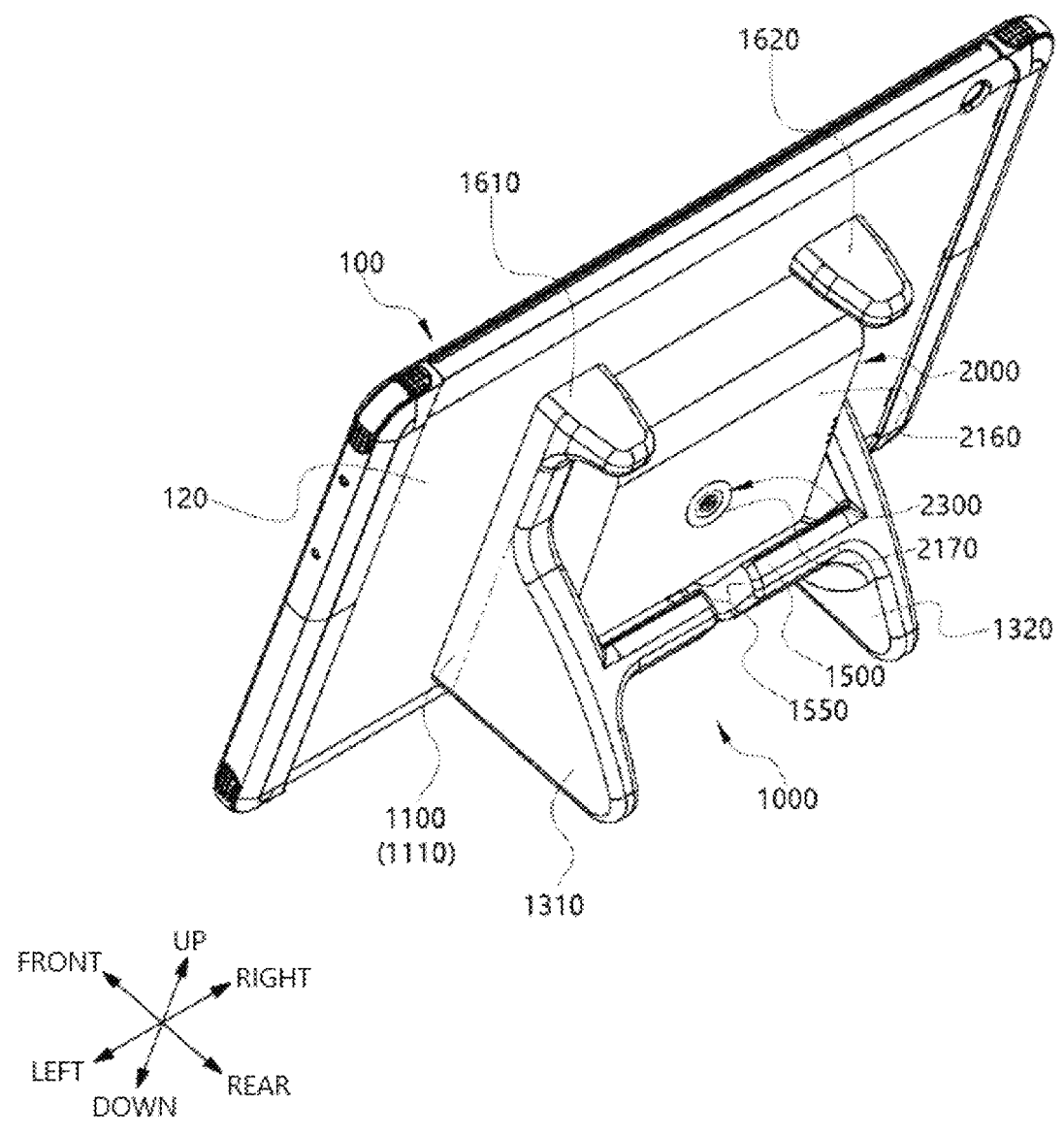
FIG. 6B is a view showing a state in which a device electrode portion and a battery front-side electrode portion are connected to each other while the battery of FIG. 4 is accommodated in the battery accommodating portion of FIG. 3.

FIG. 6A is a view showing a state before the device electrode portion 140 and the battery front-side electrode portion 2200 are connected to each other while the battery 2000 of FIG. 4 is accommodated in the battery accommodating portion 1200 of FIG. 3, and FIG. 6B is a view showing a state in which the device electrode portion 140 and the battery front-side electrode portion 2200 are connected to each other while the battery 2000 of FIG. 4 is accommodated in the battery accommodating portion 1200 of FIG. 3.

As shown in FIG. 6A, the battery 2000 may be accommodated in the battery accommodating portion 1200 in such a manner that the front surface 2130 of the battery body 2100 faces the rear side of the smart device 100, and the lower side of the battery body 2100 is seated on the battery lower-side support portion 1400. In this case, the battery escape prevention portion 1500, which forms the rear border of the battery accommodating portion 1200, may prevent the battery 2000 from escaping in a direction from the front side toward the rear side of the cradle 1000.

When an angle formed by the battery lower-side support portion 1400 and the battery escape prevention portion 1500 is 90°, the battery 2000, which has a rectangular shape, is appropriately accommodated in the battery accommodating portion 1200, such that the battery 2000 accommodated in the battery accommodating portion 1200 can be reliably prevented from escaping.

When an angle formed by the battery lower-side support portion 1400 and the battery escape prevention portion 1500 is greater than 90° and smaller than 180°, the battery 2000 may first be seated in an inclined state on the battery accommodating portion 1200 (FIG. 6A), and thereafter, the device electrode portion 140 and the battery front-side electrode portion 2200 may be connected to each other using a magnetic force between the device magnetic material 170 and the battery magnetic material 2700 (FIG. 6B). When the angle formed by the battery lower-side support portion 1400 and the battery escape prevention portion 1500 is greater than 90° and smaller than 180°, this is advantageous in that it is easy to connect the device electrode portion 140 and the battery front-side electrode portion 2200 to each other.

From this point of view, it is preferable that the angle formed by the battery lower-side support portion 1400 and the battery escape prevention portion 1500 is greater than or equal to 90° and smaller than 180°.

Figure 7:
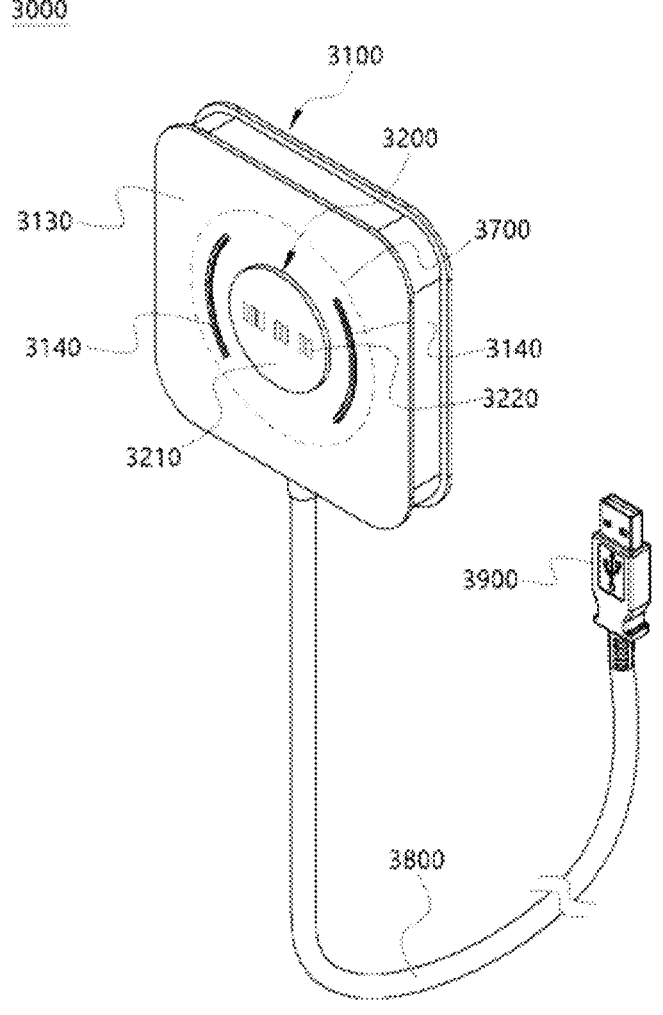
FIG. 7 is a front perspective view of an exemplary external charging device.
Figure 7:
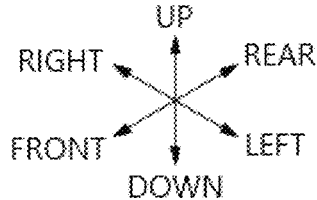

Meanwhile, FIG. 7 is a front perspective view of an exemplary external charging device. FIG. 7 shows a charging terminal 3000 as one of external charging devices.

As illustrated in FIG. 7, the charging terminal 3000 may include a terminal body 3100, a terminal electrode portion 3200, a terminal magnetic material 3700, a terminal line 3800, and a terminal connector 3900.

The terminal body 3100 may have a substantially rectangular parallelepiped shape, and the terminal electrode portion 3200 is provided on the front surface 3130 of the terminal body 3100. The terminal electrode portion 3200 is connected to the device electrode portion 140 or the cradle rear-side electrode portion 1150, which will be described later, to supply power to (that is, charge) the smart device 100, and is connected to the battery rear-side electrode portion 2300 to serve to supply power to (that is, charge) the battery 2000.

The terminal electrode portion 3200 may include a terminal electrode plate 3210 and one or more terminal electrodes 3220 disposed on the terminal electrode plate 3210. The terminal electrodes 3220 may be two or more rectangular (or circular) unit electrodes arranged in one row or in two or more rows. Alternatively, the terminal electrodes 3220 may be two or more ring-shaped unit electrodes arranged in the form of concentric circles. The terminal electrodes 3220 may include power supply electrodes used to charge the smart device 100 or the battery 2000.

The terminal magnetic material 3700 may be disposed inside the terminal body 3100. The terminal magnetic material 3700 may be magnetically coupled to the device magnetic material 170, the battery magnetic material 2700, or a cradle magnetic material 1700 to be described later. In a case where the terminal magnetic material 3700 is included in the charging terminal 3000 as described above, the charging terminal 3000 and the smart device 100 are magnetically coupled to each other, the charging terminal 3000 and the cradle 1000' or 1000" are magnetically coupled to each other, and the charging terminal 3000 and the battery 2000 are magnetically coupled to each other. Therefore, the charging terminal 3000 can be more easily and stably coupled to the smart device 100, the cradle 1000' or 1000", and the battery 2000, and furthermore, electrical connection between the terminal electrodes 3220 and the device electrodes 142, between the terminal electrodes 3220 and the battery rear-side electrodes 2320, and between the terminal electrodes 3220 and the cradle rear-side electrodes 1152 can be realized in a relatively reliable manner.

A terminal protrusion 3140 that is discontinuously or continuously circular may be provided around the terminal electrode portion 3200 on the front surface 3130 of the terminal body 3100, with the terminal electrode portion 3200 as the center. Here, the terminal protrusion 3140 may have a shape other than a circle, such as a square or a bar.

The terminal protrusion 3140 may be mechanically coupled to the device groove 144 provided on the rear surface 120 of the smart device 100 shown in FIG. 1B, the second battery groove 2170 provided on the rear surface 2160 of the battery body 2100 shown in FIG. 4B, or a second cradle groove 1137 provided on a rear surface 1136 of a device support body 1130 shown in FIG. 9B, which will be described later. When the mechanical coupling between the terminal protrusion 3140 and the device groove 144 (or the second battery groove 2170 or the second cradle groove 1137) is achieved together with or separately from the magnetic coupling between the magnetic materials described above, the charging terminal 3000 can be stably coupled to the smart device 100 (or the battery 2000 or the cradle 1000' or 1000"), enabling stable electrical connection between the terminal electrodes 3220 and the device electrodes 142 (or between the battery rear-side electrodes 2320 and the cradle rear-side electrodes 1152).

Reversely, a terminal groove (not shown) that is continuously or discontinuously circular may be provided around the terminal electrode portion 3200 on the front surface 3130 of the terminal body 3100, with the terminal electrode portion 3200 as the center. Here, the terminal groove may have a shape other than a circle. In addition, the terminal groove corresponds to a modification of FIG. 7 as described above, and the terminal groove may be formed in the same manner as, for example, the second battery groove 2170 provided around the battery rear-side electrode portion 2300 in FIG. 4B.

The terminal groove may be mechanically coupled to the device protrusion 147 provided on the rear surface 120 of the smart device 100 shown in FIG. 5, a second battery protrusion (not shown) that may be provided on the rear surface 2160 of the battery body 2100 as described above, or a second cradle protrusion 1138 provided on a rear surface 1136 of a device support body 1130 shown in FIG. 11B, which will be described later. When the mechanical coupling between the terminal groove and the device protrusion 147 (or the second battery protrusion or the second cradle protrusion 1138) is achieved together with or separately from the magnetic coupling between the magnetic materials described above, the charging terminal 3000 can be stably coupled to the smart device 100 (or the battery 2000 or the cradle 1000' or 1000''), enabling stable electrical connection between the terminal electrodes 3220 and the device electrodes 142 (or between the battery rear-side electrodes 2320 and the cradle rear-side electrodes 1152).

The terminal line 3800 serves to perform electrical connection or communication connection between the terminal body 3100 and the terminal connector 3900. The terminal connector 3900 is connected to, for example, a USB terminal of a computer, and serves to supply direct current power output from the computer to the smart device 100. When the terminal connector 3900 is connected to a USB terminal of a computer, a terminal LED (not shown) may be provided on a rear surface of the terminal body 3100 to indicate the connection.

Figure 8:
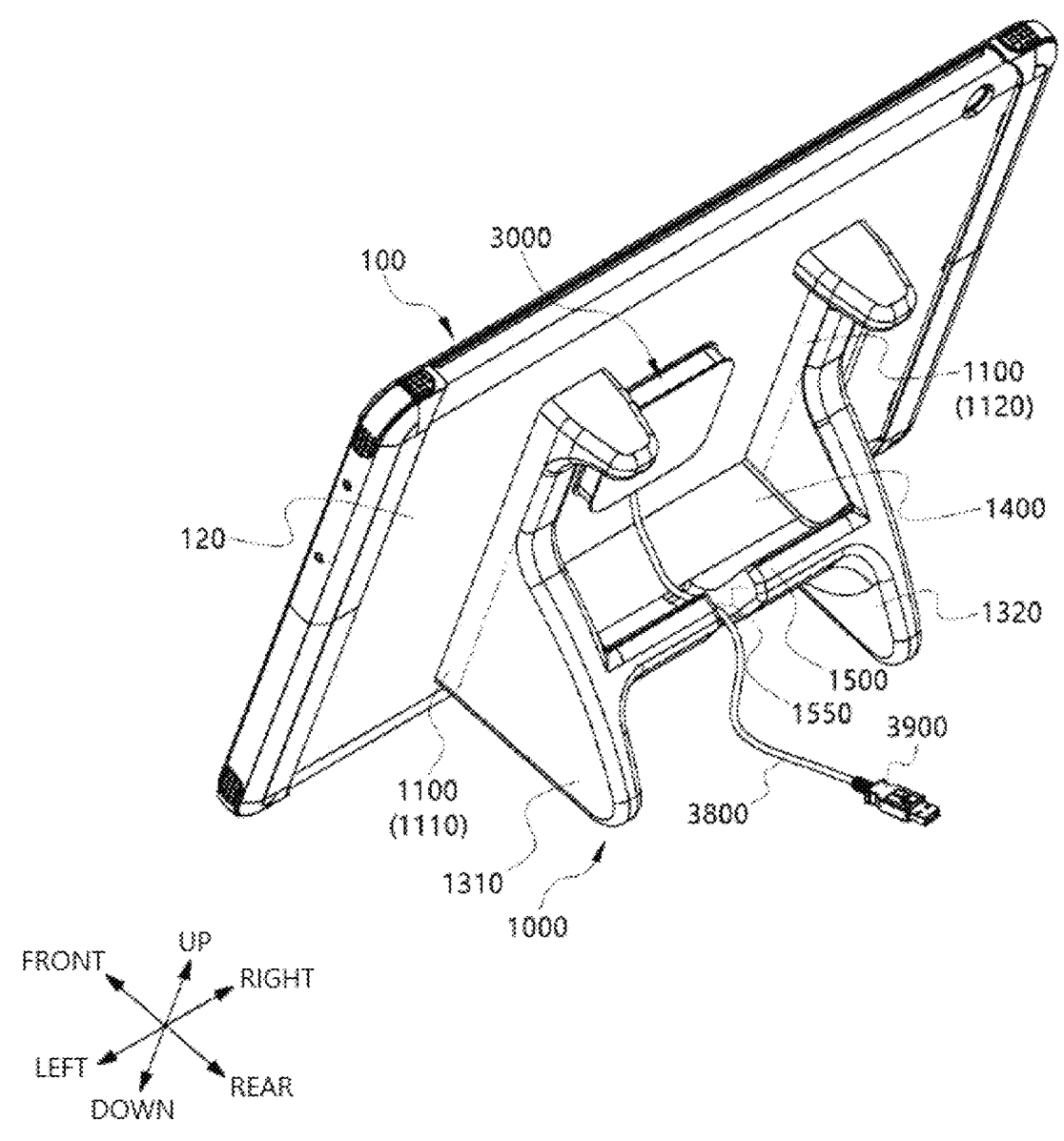
FIG. 8 is a view showing a state in which a partial portion of an external charging device is accommodated in a groove of the cradle.

FIG. 8 is a view showing a state in which a partial portion of an external charging device, for example, the terminal line 3800 of the charging terminal 3000, is accommodated in a groove 1550 of the cradle 1000. Here, the groove 1550 may be provided in the battery escape prevention portion 1500. More specifically, the groove 1550 may be provided in the battery escape prevention portion 1500, starting from an upper side of the battery escape prevention portion 1500 in a direction toward a lower side of the battery escape prevention portion 1500.

When the smart device 100 is mounted on the cradle 1000, the smart device 100 is not necessarily charged only by the battery 2000, and may be charged by an external charging device such as the charging terminal 3000.

In a case where the smart device 100 mounted on the cradle 1000 is charged by the charging terminal 3000, electrical connection between the device electrode portion 140 and the terminal electrode portion 3200 is made by a magnetic force between the device magnetic material 170 and the terminal magnetic material 3700 as shown in FIG. 8. At this time, in a case where the groove 1550 is provided in the battery escape prevention portion 1500, entry and exit of the terminal line 3800 becomes easier, making it easier to charge the smart device 100 mounted on the cradle 1000.

Figure 9A:
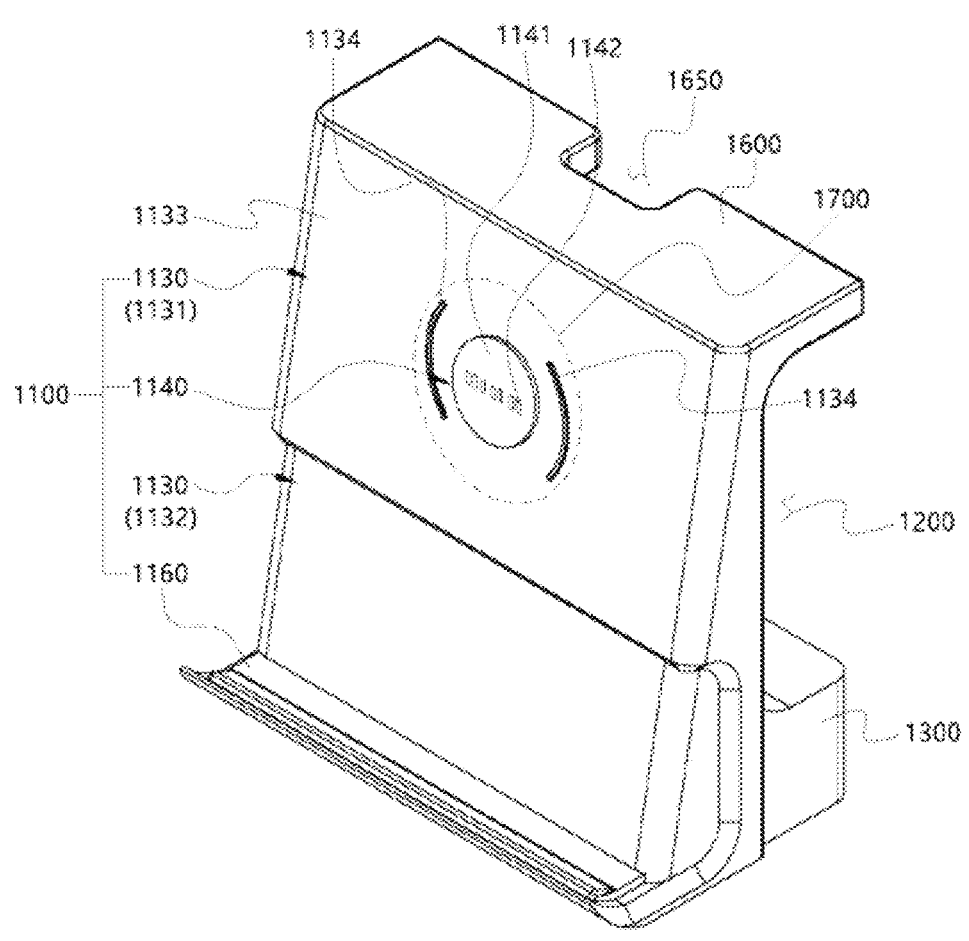
FIG. 9A is a front perspective view of a cradle for mounting a smart device according to a second embodiment of the present invention.
Figure 9A:
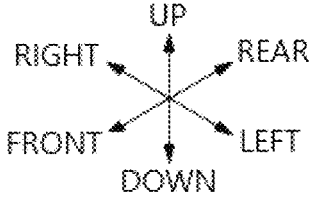
Figure 9B:
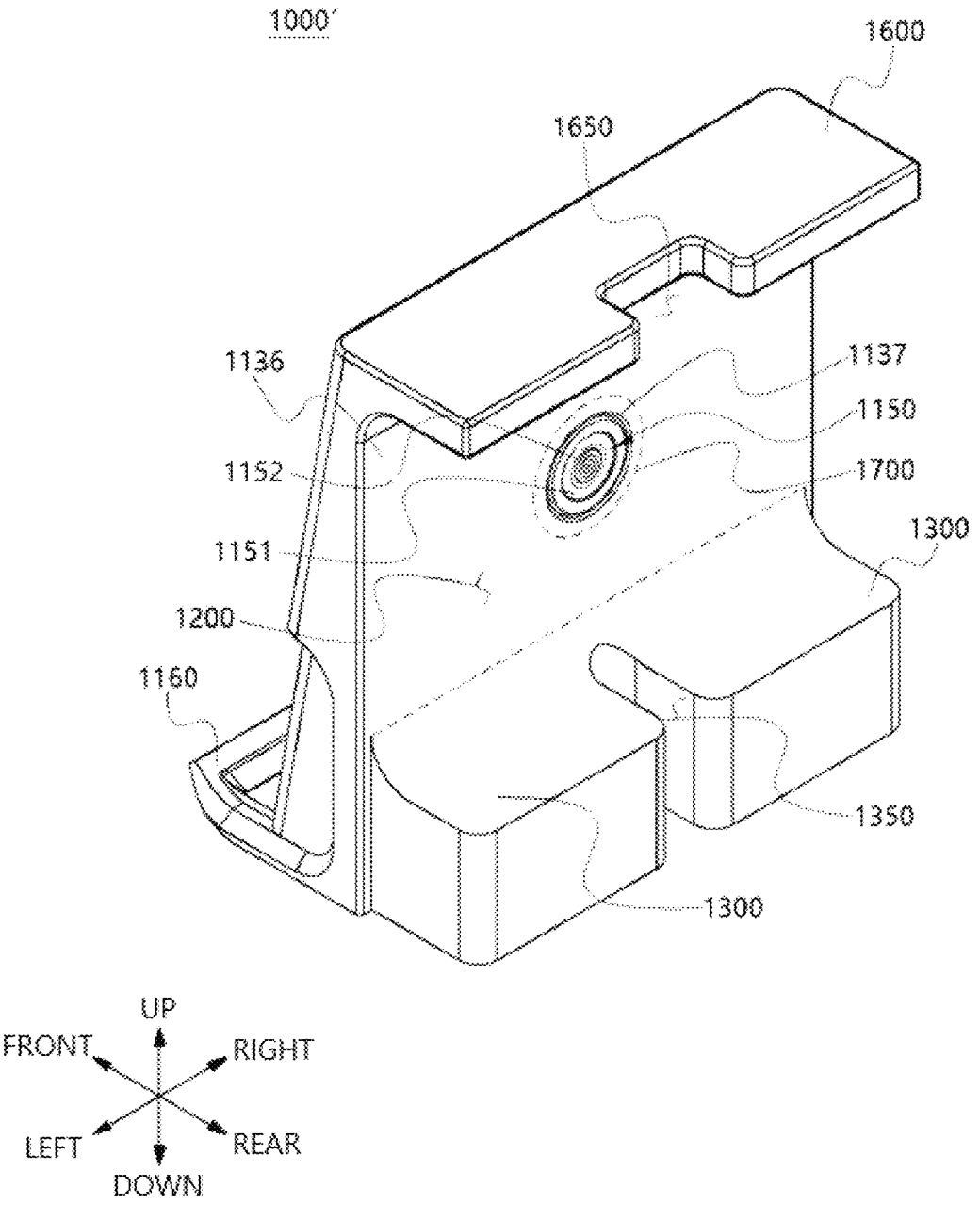
FIG. 9B is a rear perspective view of the cradle shown in FIG. 9A.

FIG. 9A is a front perspective view of a cradle 1000' for mounting a smart device according to a second embodiment of the present invention, and FIG. 9B is a rear perspective view of the cradle 1000' shown in FIG. 9A. In addition, FIG. 10A is a view showing a state before the smart device of FIG. 1, the cradle of FIG. 9, and the battery of FIG. 4 are connected to each other, and FIG. 10B is a view showing a state in which the smart device of FIG. 1, the cradle of FIG. 9, and the battery of FIG. 4 are connected to each other.

As shown in FIG. 9, the cradle 1000' according to the second embodiment of the present invention also includes a device support portion 1100 and a battery accommodating portion 1200, like the cradle 1000 according to the first embodiment.

The device support portion 1100 supports the rear side of the smart device 100 as at least a partial portion of the device support portion 1100 contacts the rear surface 120 of the smart device 100.

The battery accommodating portion 1200 is provided on the basis of the device support portion 1100, and accommodates a battery 2000 capable of supplying power to the smart device 100 through the device electrode portion 140 provided in the smart device 100.

In the cradle 1000' according to the second embodiment of the present invention, the device support portion 1100 includes a device support body 1130 and a cradle front-side electrode portion 1140, and may further include one or more of a cradle rear-side electrode portion 1150 and a forward extension portion 1160.

The device support body 1130 may have an overall rectangular shape, and at least a partial portion of the device support body 1130 contacts the rear side of the smart device 100.

In a case where the device support portion 1100 according to the first embodiment of the present invention supports the rear side of the smart device 100, the device electrode portion 140 provided on the rear side of the smart device 100 is exposed as shown in FIG. 3. On the other hand, in a case where the device support portion 1100 according to the second embodiment of the present invention supports the rear side of the smart device 100, the device electrode portion 140 provided on the rear side of the smart device 100 is hidden by the device support body 1130 and the cradle front-side electrode portion 1140.

The device support body 1130 may include a smart device rear-side contact portion 1131 and a smart device rear-side non-contact portion 1132.

The smart device rear-side contact portion 1131 is a portion that includes the cradle front-side electrode portion 1140, and is a portion that directly contacts the rear side of the smart device 100.

On the other hand, the smart device rear-side non-contact portion 1132 is a portion that is located below the smart device rear-side contact portion 1131 and does not contact the rear side of the smart device 100 because it is recessed more than the smart device rear-side contact portion 1131 in a direction from a front side toward a rear side of the cradle 1000'. In addition, since the smart device rear-side non-contact portion 1132 is a portion that does not contact the rear side of the smart device 100 as described above, the smart device rear-side non-contact portion 1132 does not include the cradle front-side electrode portion 1140.

When the cradle 1000' mounts the smart device 100 thereon, the rear side (or the rear surface 120) of the smart device 100 contacts the front surface 3130 of the device support body 1130. At this time, by providing the smart device rear-side non-contact portion 1132 below the smart device rear-side contact portion 1131, it is possible to reduce an area where the rear side of the smart device 100 contacts the cradle 1000'. In this case, a friction between the rear side (or the rear surface 120) of the smart device 100 and the front surface 3130 of the device support body 1130 is reduced, making it possible to easily place the smart device 100 on the cradle 1000', and easily bring the smart device 100 out of the cradle 1000'.

The cradle front-side electrode portion 1140 is provided on a front side of the device support body 1130, and is connected to the device electrode portion 140 to supply power to the smart device 100.

The cradle front-side electrode portion 1140 may include a cradle front-side electrode plate 1141 and one or more cradle front-side electrodes 1142 disposed on the cradle front-side electrode plate 1141. The cradle front-side electrodes 1142 may be two or more rectangular (or circular) unit electrodes arranged in one row or in two or more rows. Alternatively, the cradle front-side electrodes 1142 may be two or more ring-shaped unit electrodes arranged in the form of concentric circles. The cradle front-side electrodes 1142 may include power supply electrodes used to charge the smart device 100.

As described above with reference to FIG. 1, the device electrode portion 140 may be recessed from the rear surface 120 of the smart device 100. In this regard, the cradle front-side electrode portion 1140 may protrude from a front surface 1133 of the device support body 1130 in a direction from the rear side toward the front side of the cradle 1000', as shown in FIG. 9A.

In a case where the cradle front-side electrode portion 1140 protrudes from the front surface 1133 of the device support body 1130 with respect to the device electrode portion 140 recessed from the rear surface 120 of the smart device 100 as described above, mechanical coupling can be made between the device electrode portion 140 and the cradle front-side electrode portion 1140, thereby easily achieving electrical connection between the device electrodes 142 and the cradle front-side electrodes 1142.

In addition, as a result of the mechanical coupling between the device electrode portion 140 and the cradle front-side electrode portion 1140, matching between the device electrodes 142 and the cradle front-side electrodes 1142 can be achieved. Accordingly, short circuits between the device electrodes 142 and the cradle front-side electrodes 1142 can be prevented, enabling more stable electrical connection between the electrodes 142 and 1142.

A cradle magnetic material 1700 may be disposed inside the device support body 1130. The cradle magnetic material 1700 may be magnetically coupled to the device magnetic material 170, the battery magnetic material 2700, and the charging terminal magnetic material 3700. In a case where the cradle magnetic material 1700 is included in the cradle 1000' as described above, the cradle 1000' and the smart device 100 are magnetically coupled to each other, the cradle 1000' and the battery 2000 are magnetically coupled to each other, and the cradle 1000' and the charging terminal 3000 are magnetically coupled to each other. Therefore, the cradle 1000' can be more easily and stably coupled to the smart device 100, the battery 2000, and the charging terminal 3000, and furthermore, electrical connection between the cradle front-side electrodes 1142 and the device electrodes 142, between cradle rear-side electrodes 1152 to be described later and the battery front-side electrodes 2220, and between the cradle rear-side electrodes 1152 and the terminal electrodes 3220 can be realized in a relatively reliable manner.

As described above with reference to FIG. 1, the device groove 144 may be provided around the device electrode portion 140 on the rear surface 120 of the smart device 100, with the device electrode portion 140 as the center. In this regard, a first cradle protrusion 1134 that is discontinuously or continuously circular may be provided around the cradle front-side electrode portion 1140 on the front surface 1133 of the device support body 1130, with the cradle front-side electrode portion 1140 as the center. Here, the first cradle protrusion 1134 may have a shape other than a circle, such as a square or a bar.

The first cradle protrusion 1134 may be mechanically coupled to the device groove 144 of the smart device 100 shown in FIG. 1B. When the mechanical coupling between the first cradle protrusion 1134 and the device groove 144 is achieved together with or separately from the magnetic coupling between the cradle magnetic material 1700 and the device magnetic material 170 described above, the cradle 1000' can be stably coupled to the smart device 100, enabling stable electrical connection between the cradle front-side electrodes 1142 and the device electrodes 142. In particular, in a case where first cradle protrusions 1134 are provided symmetrically around the cradle front-side electrode portion 1140, stable mechanical coupling can be achieved between the first cradle protrusions 1134 and the device grooves 144, and accordingly, electrical connection between the cradle front-side electrodes 1142 and the device electrodes 142 can be made in a relatively stable manner.

Figure 11A:
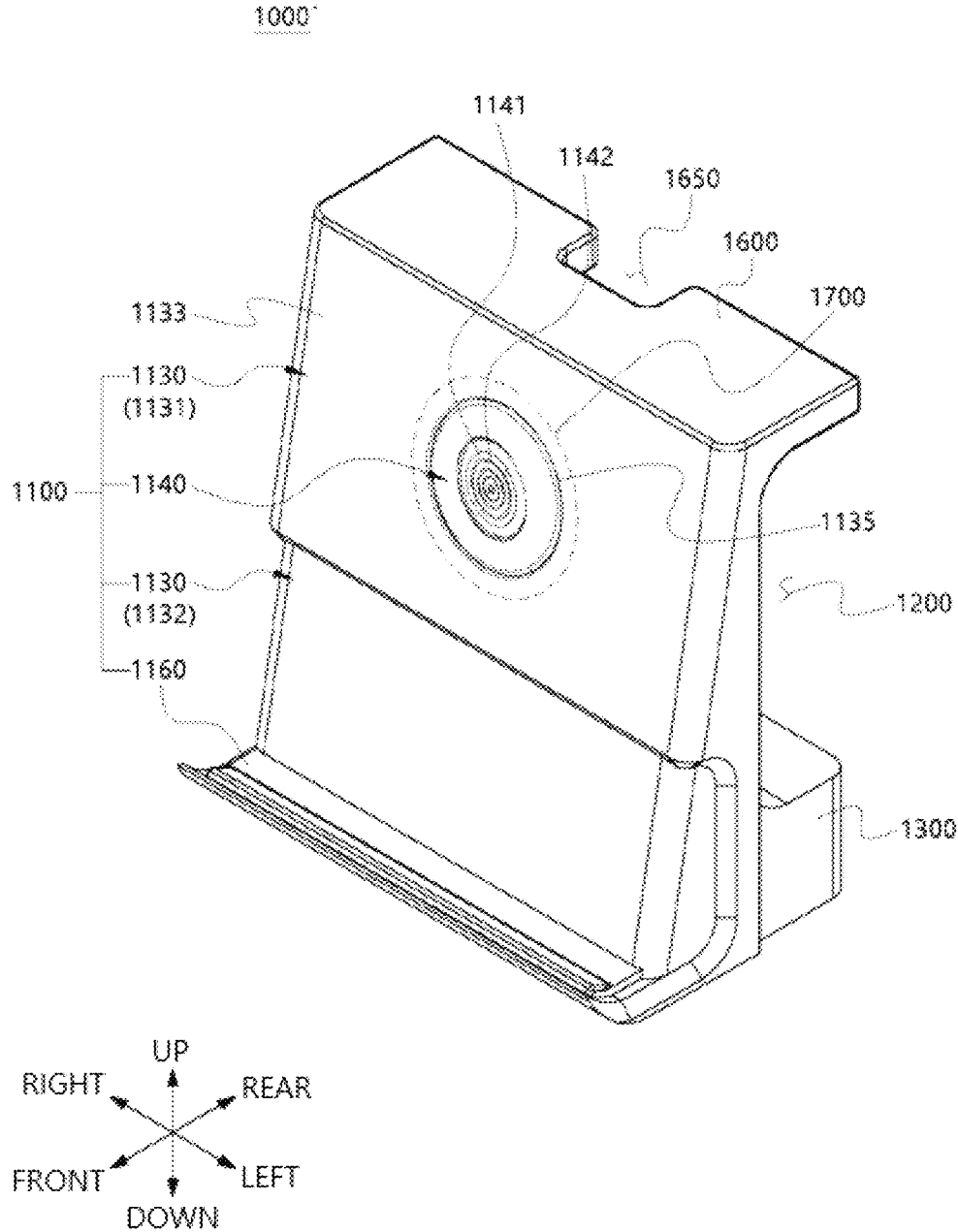
FIG. 11A is a modification of the front perspective view of the cradle shown in FIG. 9A.

FIG. 11A is a modification of the front perspective view of the cradle 1000' shown in FIG. 9A. FIG. 11A is different from FIG. 9A only in the shape of the cradle front-side electrode portion 1140 and in that a first cradle groove 1135 is provided instead of the first cradle protrusion 1134, while the description of the other components mentioned with respect to FIG. 9A may also be identically applied to the components shown in FIG. 11A. Therefore, only the differences will be described below.

As described above with reference to FIG. 5, the device electrode portion 140 may protrude from the rear surface 120 of the smart device 100. In this regard, the cradle front-side electrode portion 1140 may be recessed from the front surface 1133 of the device support body 1130 in the direction from the front side toward the rear side of the cradle 1000', as shown in FIG. 11A.

In a case where the cradle front-side electrode portion 1140 is recessed from the front surface 1133 of the device support body 1130 with respect to the device electrode portion 140 protruding from the rear surface 120 of the smart device 100 as described above, mechanical coupling can be made between the device electrode portion 140 and the cradle front-side electrode portion 1140, thereby easily achieving electrical connection between the device electrodes 142 and the cradle front-side electrodes 1142.

In addition, as a result of the mechanical coupling between the device electrode portion 140 and the cradle front-side electrode portion 1140, matching between the device electrodes 142 and the cradle front-side electrodes 1142 can be achieved. Accordingly, short circuits between the device electrodes 142 and the cradle front-side electrodes 1142 can be prevented, enabling more stable electrical connection between the electrodes 142 and 1142.

As described above with reference to FIG. 5, the device protrusion 147 may be provided around the device electrode portion 140 on the rear surface 120 of the smart device 100, with the device electrode portion 140 as the center. In this regard, a first cradle groove 1135 that is continuously or discontinuously circular may be provided around the cradle front-side electrode portion 1140 on the front surface 1133 of the device support body 1130, with the cradle front-side electrode portion 1140 as the center. Here, the first cradle groove 1135 may have a shape other than a circle, such as a square or a bar.

The first cradle groove 1135 can be mechanically coupled to the device protrusion 147 of the smart device 100 shown in FIG. 5. When the mechanical coupling between the first cradle groove 1135 and the device protrusion 147 is achieved together with or separately from the magnetic coupling between the cradle magnetic material 1700 and the device magnetic material 170 described above, the cradle 1000' can be stably coupled to the smart device 100, enabling stable electrical connection between the cradle front-side electrodes 1142 and the device electrodes 142. In particular, in a case where first cradle grooves 1135 are provided symmetrically around the cradle front-side electrode portion 1140, stable mechanical coupling can be achieved between the first cradle grooves 1135 and the device protrusions 147, and accordingly, electrical connection between the cradle front-side electrodes 1142 and the device electrodes 142 can be made in a relatively stable manner.

Meanwhile, referring to FIG. 9B, the cradle rear-side electrode portion 1150 may be provided on a rear side of the device support body 1130, and electrically connected to the cradle front-side electrode portion 1140. The cradle rear-side electrode portion 1150 is connected to the battery front-side electrode portion 2200 of the battery 2000 accommodated in the battery accommodating portion 1200 to supply power to the smart device 100 mounted on the cradle 1000'. That is, in a case where the battery body 2100 is accommodated in the battery accommodating portion 1200 shown in FIG. 9, the power supplied through the battery 2000 may be used to charge the smart device 100 mounted on the cradle 1000', after passing through the battery front-side electrode portion 2200, the cradle rear-side electrode portion 1150, the cradle front-side electrode portion 1140, and the device electrode portion 140.

Alternatively, the cradle rear-side electrode portion 1150 is directly connected to the terminal electrode portion 3200 such that power is supplied to the smart device 100 mounted on the cradle 1000', not by the battery 2000. In this case, the power supplied through the charging terminal 3000 may be used to charge the smart device 100 mounted on the cradle 1000', after passing through the terminal electrode portion 3200, the cradle rear-side electrode portion 1150, the cradle front-side electrode portion 1140, and the device electrode portion 140.

As described above with reference to FIG. 4A, the battery front-side electrode portion 2200 may protrude from the front surface 2130 of the battery body 2100. In this regard, the cradle rear-side electrode portion 1150 may be recessed from the rear surface 1136 of the device support body 1130 in the direction from the rear side toward the front side of the cradle 1000', as shown in FIG. 9B.

In a case where the cradle rear-side electrode portion 1150 is recessed from the rear surface 1136 of the device support body 1130 with respect to the battery front-side electrode portion n 2200 protruding from the front surface 2130 of the battery body 2100 as described above, mechanical coupling can be made between the battery front-side electrode portion 2200 and the cradle rear-side electrode portion 1150, thereby easily achieving electrical connection between the battery front-side electrodes 2220 and the cradle rear-side electrodes 1152.

In addition, as a result of the mechanical coupling between the battery front-side electrode portion 2200 and the cradle rear-side electrode portion 1150, matching between the battery front-side electrodes 2220 and the cradle rear-side electrodes 1152 can be achieved. Accordingly, short circuits between the battery front-side electrodes 2220 and the cradle rear-side electrodes 1152 can be prevented, enabling more stable electrical connection between the electrodes 1152 and 2220.

As described above with reference to FIG. 4A, the first battery protrusion 2140 may be provided around the battery front-side electrode portion 2200 on the front surface 2130 of the battery body 2100, with the battery front-side electrode portion 2200 as the center. In this regard, a second cradle groove 1137 that is continuously or discontinuously circular may be provided around the cradle rear-side electrode portion 1150 on the rear surface 1136 of the device support body 1130, with the cradle rear-side electrode portion 1150 as the center. Here, the second cradle groove 1137 may have a shape other than a circle, such as a square or a bar.

The second cradle groove 1137 can be mechanically coupled to the first battery protrusion 2140 of the battery 2000 shown in FIG. 4A. When the mechanical coupling between the second cradle groove 1137 and the first battery protrusion 2140 is achieved together with or separately from the magnetic coupling between the cradle magnetic material

1700 and the battery magnetic material 2700 described above, the battery 2000 can be stably coupled to the cradle 1000', enabling stable electrical connection between the cradle rear-side electrodes 1152 and the battery front-side electrodes 2220. In particular, in a case where second cradle grooves 1137 are provided symmetrically around the cradle rear-side electrode portion 1140, stable mechanical coupling can be achieved between the second cradle grooves 1137 and the first battery protrusions 2140, and accordingly, electrical connection between the cradle rear-side electrodes 1152 and the battery front-side electrodes 2220 can be made in a relatively stable manner.

Figure 11B:
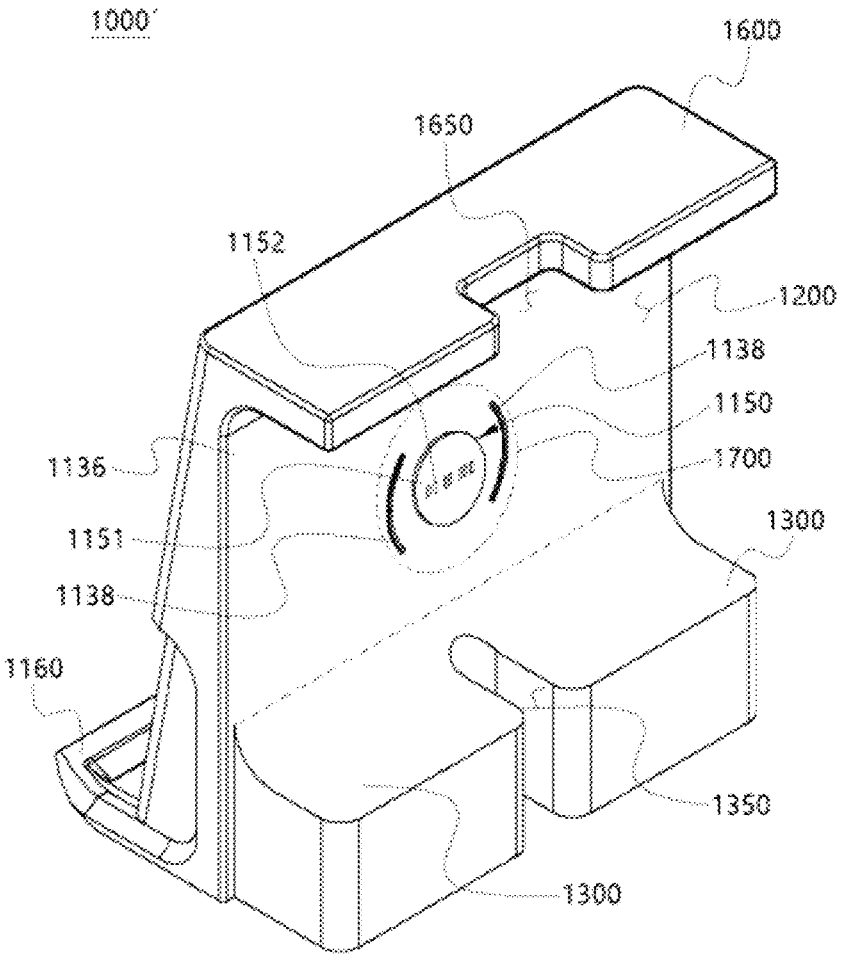
FIG. 11B is a modification of the rear perspective view of the cradle shown in FIG. 9B.
Figure 11B:
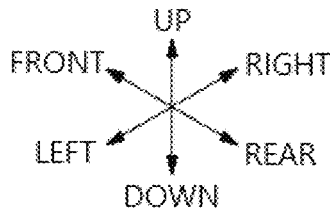

FIG. 11B is a modification of the rear perspective view of the cradle 1000' shown in FIG. 9B. FIG. 11B is different from FIG. 9B only in the shape of the cradle rear-side electrode portion 1150 and in that a second cradle protrusion 1138 is provided instead of the second cradle groove 1137, while the description of the other components mentioned with respect to FIG. 9B may also be identically applied to the components shown in FIG. 11B. Therefore, only the differences will be described below.

Although it has been described above that the battery rear-side electrode portion 2300 shown in FIG. 4B is connected to the terminal electrode portion 3200 of the charging terminal 3000 shown in FIG. 7, the battery rear-side electrode portion 2300 shown in FIG. 4B may be connected to the cradle rear-side electrode portion 1150 of the cradle 1000' shown in FIG. 11B in some cases. That is, the battery body 2100 may be accommodated in the battery accommodating portion 1200 shown in FIG. 11B. In this case, the battery rear-side electrode portion 2300 shown in FIG. 4B is connected to the cradle rear-side electrode portion 1150 shown in FIG. 11B.

As described above with reference to FIG. 4B, the battery rear-side electrode portion 2300 may be recessed from the rear surface 2160 of the battery body 2100. In this regard, the cradle rear-side electrode portion 1150 may protrude from the rear surface 1136 of the device support body 1130 in the direction from the front side toward the rear side of the cradle 1000', as shown in FIG. 11B.

In a case where the cradle rear-side electrode portion 1150 protrudes from the rear surface 1136 of the device support body 1130 with respect to the battery rear-side electrode portion 2300 recessed from the rear surface 2160 of the battery body 2100 as described above, mechanical coupling can be made between the battery rear-side electrode portion 2300 and the cradle rear-side electrode portion 1150, thereby easily achieving electrical connection between the battery rear-side electrodes 2320 and the cradle rear-side electrodes 1152.

In addition, as a result of the mechanical coupling between the battery rear-side electrode portion 2300 and the cradle rear-side electrode portion 1150, matching between the battery rear-side electrodes 2320 and the cradle rear-side electrodes 1152 can be achieved. Accordingly, short circuits between the battery rear-side electrodes 2320 and the cradle rear-side electrodes 1152 can be prevented, enabling more stable electrical connection between the electrodes 1152 and 2320.

As described above with reference to FIG. 4B, the second battery groove 2170 may be provided around the battery rear-side electrode portion 2300 on the rear surface 2160 of the battery body 2100, with the battery rear-side electrode portion 2300 as the center. In this regard, a second cradle protrusion 1138 that is continuously or discontinuously circular may be provided around the cradle rear-side electrode portion 1150 on the rear surface 1136 of the device support body 1130, with the cradle rear-side electrode portion 1150 as the center. Here, the second cradle protrusion 1138 may have a shape other than a circle, such as a square or a bar.

The second cradle protrusion 1138 can be mechanically coupled to the second battery groove 2170 of the battery 2000 shown in FIG. 4B. When the mechanical coupling between the second cradle protrusion 1138 and the second battery groove 2170 is achieved together with or separately from the magnetic coupling between the cradle magnetic material 1700 and the battery magnetic material 2700 described above, the battery 2000 can be stably coupled to the cradle 1000', enabling stable electrical connection between the cradle rear-side electrodes 1152 and the battery rear-side electrodes 2320. In particular, in a case where second cradle protrusions 1138 are provided symmetrically around the cradle rear-side electrode portion 1150, stable mechanical coupling can be achieved between the second cradle protrusion 1138 and the second battery groove 2170, and accordingly, electrical connection between the cradle rear-side electrodes 1152 and the battery rear-side electrodes 2320 can be made in a relatively stable manner.

As shown in FIGS. 9A and 11A, the device support portion 1100 further include may a forward extension portion 1160. The forward extension portion 1160 extends from at least a lower portion of the entire area of the device support body 1130, and extends from the rear side toward the front side of the cradle 1000. Here, the lower portion of the device support body 1130 refers to a portion below the center of the device support body 1130 in the up-down direction.

Figure 10B:
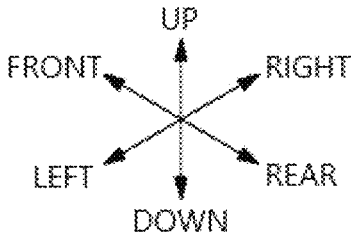

The forward extension portion 1160 contributes to stably mounting the smart device 100 by expanding an area where the cradle 1000' is in contact with the ground and supporting a lower portion of the smart device 100 mounted on the cradle 1000' as shown in FIG. 10.

The cradle 1000' according to the second embodiment of the present invention may further include one or more of a rearward extension portion 1300 and an upper extension portion 1600, in addition to the device support portion 1100 and the battery accommodating portion 1200 described above.

The rearward extension portion 1300 extends from at least a lower portion of the entire area of the device support body 1130 like the forward extension portion 1160, but extends in the direction from the front side toward the rear side of the cradle 1000' unlike the forward extension portion 1160. The rearward extension portion 1300 contributes to stably mounting the smart device 100 by expanding an area where the cradle 1000' is in contact with the ground on the opposite side (i.e., the rear side of the cradle 1000' in FIG. 10B) of the side (i.e., the front side of the cradle 1000' in FIG. 10B) where the smart device 100 is mounted of the cradle 1000'.

In addition, the rearward extension portion 1300 may be configured to support the lower side of the battery 2000 accommodated in the battery accommodating portion 1200 by extending in the left-right direction of the cradle 1000' as shown in FIG. 9B or 11B. In this case, the rearward extension portion 1300 contributes to stably mounting the smart device 100 and stably accommodating the battery 2000 by further expanding the area where the cradle 1000' is in contact with the ground and supporting the lower side of the battery 2000 accommodated in the battery accommodating portion 1200.

In addition, the rearward extension portion 1300 forms the battery accommodating portion 1200, together with the device support body 1130. That is, the device support body

1130 forms a front border of the battery accommodating portion 1200, and the rearward extension portion 1300 forms a lower border of the battery accommodating portion 1200. Furthermore, the upper extension portion 1600, which will be described later, forms an upper border of the battery accommodating portion 1200.

For the same reason as the groove 1550 mentioned above, a groove 1350 may be provided in the rearward extension portion 1300, starting from an upper side of the rearward extension portion 1300 in a direction toward a lower side of the rearward extension portion 1300. That is, in a case where the groove 1350 is provided in the rearward extension portion 1300, entry and exit of the terminal line 3800 becomes easier, making it easier to charge the smart device 100 mounted on the cradle 1000'.

The upper extension portion 1600 extends from at least an upper portion of the entire area of the device support body 1130, and extends in the direction from the front side toward the rear side of the cradle 1000'. Here, the upper portion of the device support body 1130 refers to a portion above the center of the device support body 1130 in the up-down direction.

The upper extension portion 1600 serves to form an upper border of the battery accommodating portion 1200, and prevent the battery 2000 accommodated in the battery accommodating portion 1200 from escaping in a direction from the lower side toward the upper side of the cradle 1000.

An opening 1650 may be provided in the upper extension portion 1600, starting from the rear side of the upper extension portion 1600 in a direction toward the front side of the upper extension portion 1600. The opening 1650 is intended to easily check a remaining amount of power stored in the battery 2000 through a remaining amount display unit 2800 of the battery 2000 accommodated in the battery accommodating portion 1200.

Figure 12:
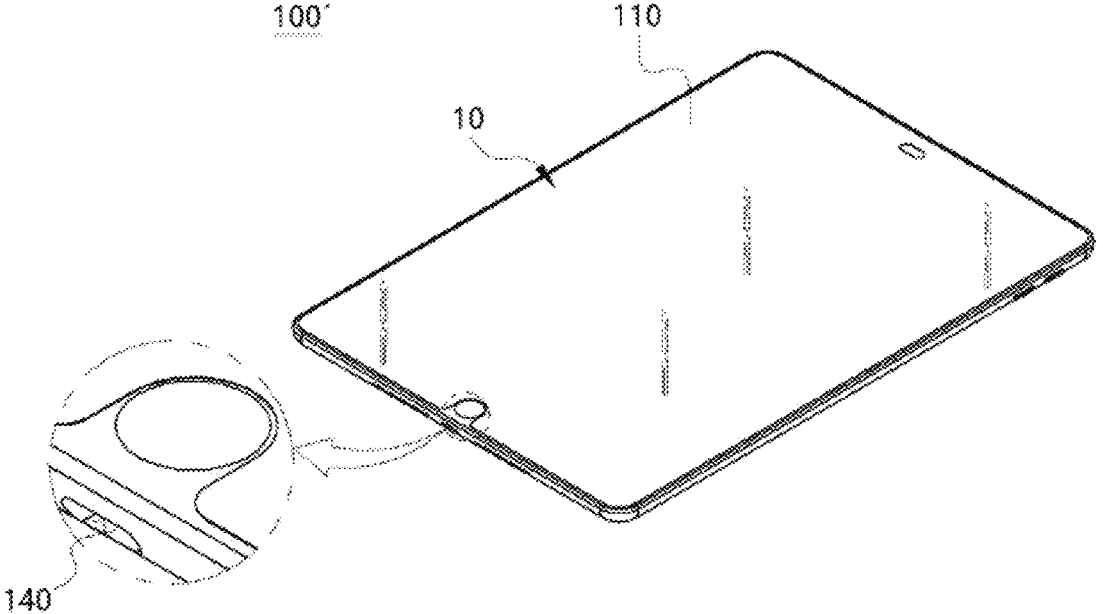
FIG. 12 is a front perspective view of a smart device different from that of FIG. 1.

FIG. 12 is a front perspective view of a smart device 100' different from that of FIG. 1. Unlike the smart device 100 of FIG. 1, the smart device 100' of FIG. 12 is represented only by a tablet PC 10. The device electrode portion 140 is provided at one end (e.g., a lower end) of the smart device 100' shown in FIG. 12.

Figure 13:
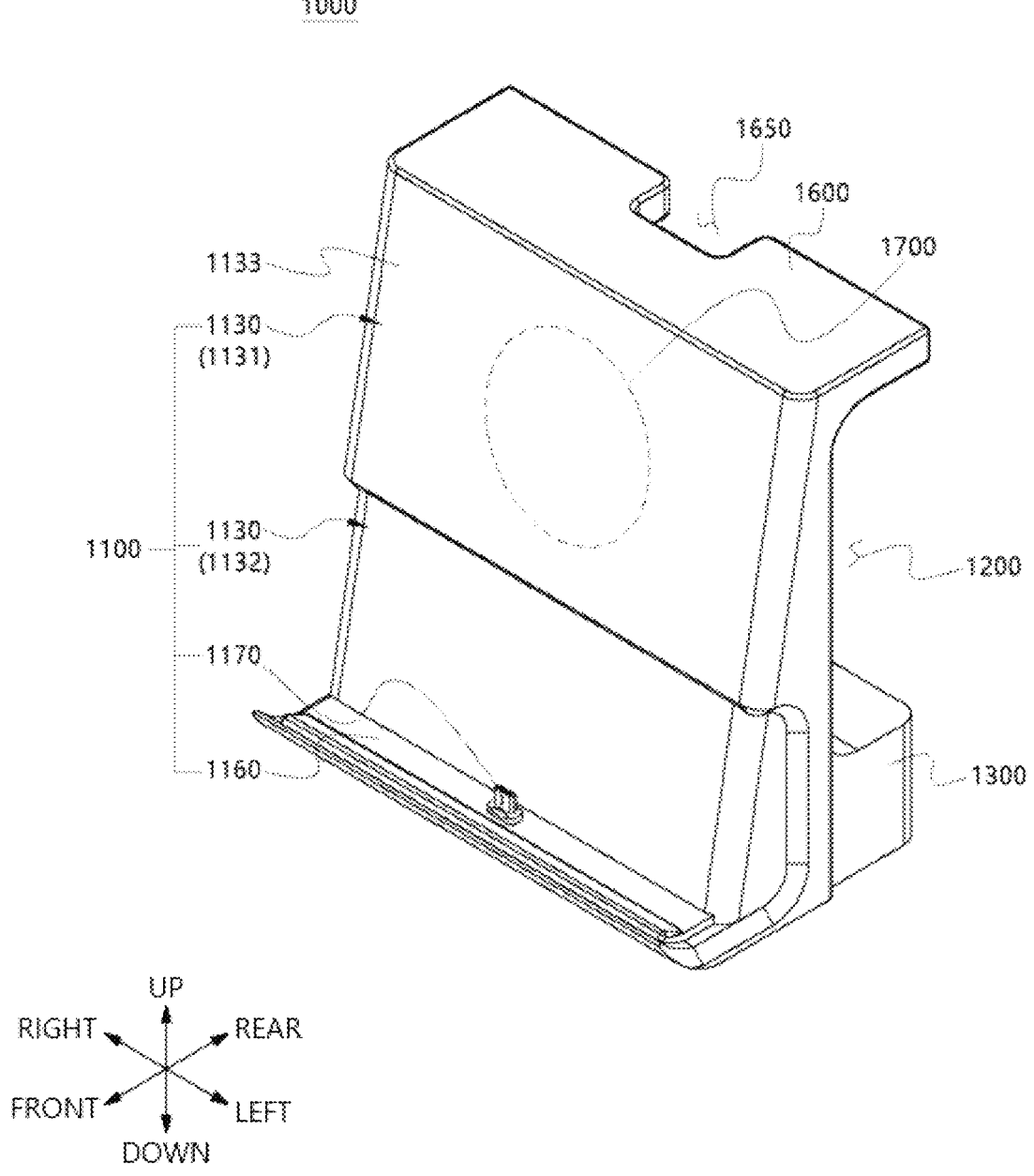
FIG. 13 is a front perspective view of a cradle according to a third embodiment of the present invention.
Figure 14A:
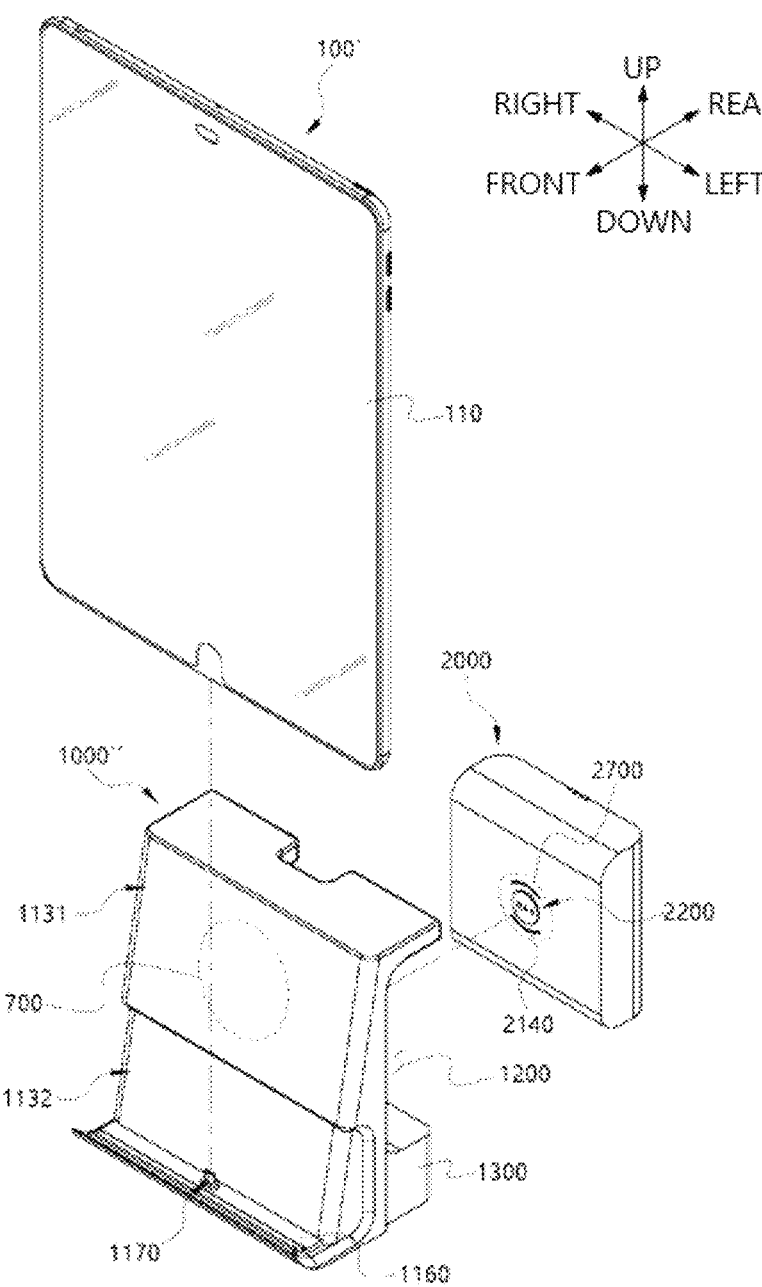
FIG. 14A is a view showing a state before the smart device of FIG. 12, the cradle of FIG. 13, and the battery of FIG. 4 are connected to each other.
Figure 14B:
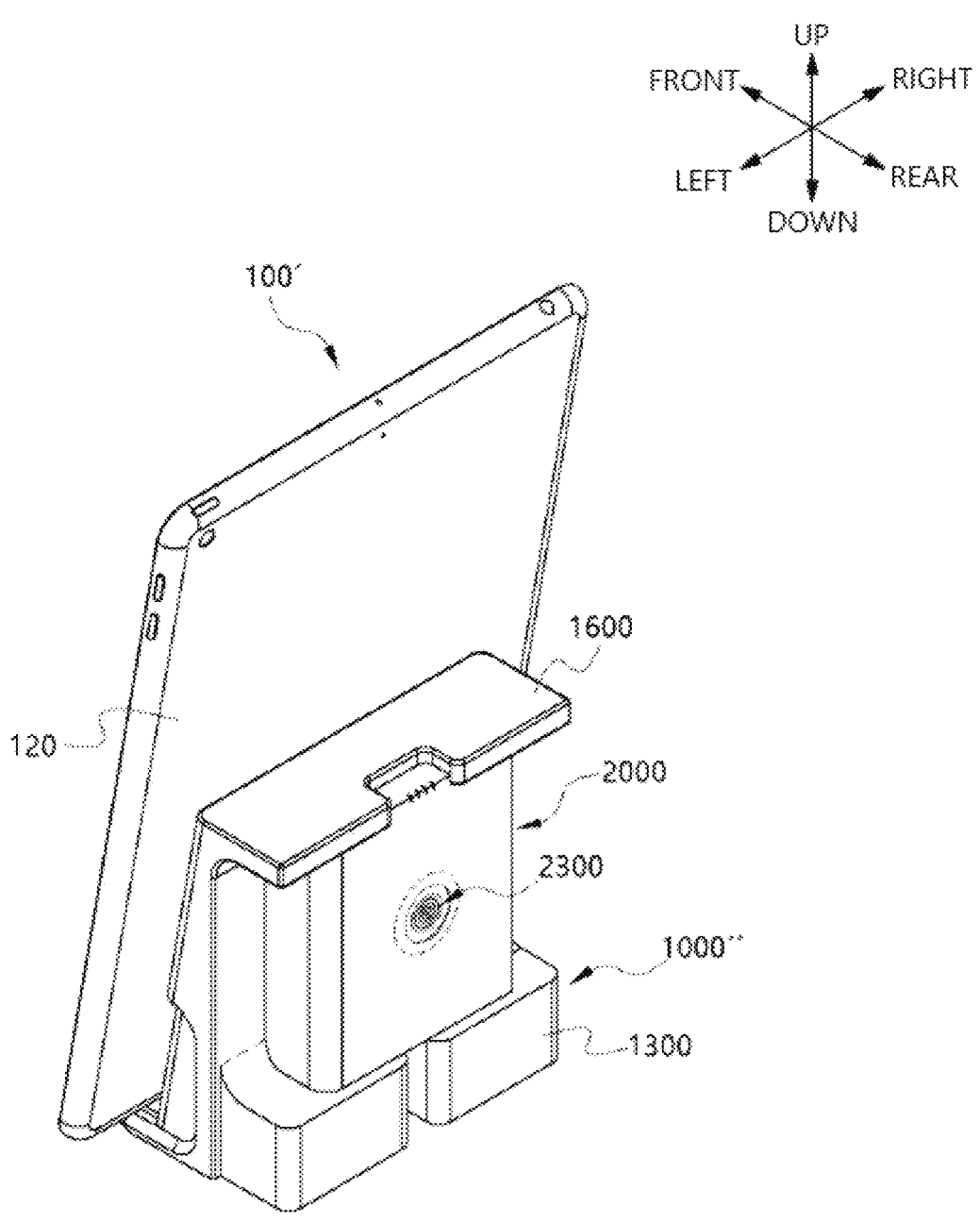
FIG. 14B is a view showing a state in which the smart device of FIG. 12, the cradle of FIG. 13, and the battery of FIG. 4 are connected to each other.

FIG. 13 is a front perspective view of a cradle 1000'' according to a third embodiment of the present invention. FIG. 14A is a view showing a state before the smart device 100' of FIG. 12, the cradle 1000'' of FIG. 13, and the battery 2000 of FIG. 4 are connected to each other, and FIG. 14B is a view showing a state in which the smart device 100' of FIG. 12, the cradle 1000'' of FIG. 13, and the battery 2000 of FIG. 4 are connected to each other.

As compared to the cradle 1000' according to the second embodiment of the present invention, the cradle 1000'' according to the third embodiment of the present invention shown in FIGS. 13 and 14 is different only in that a cradle lower-side electrode portion 1170 is provided instead of the cradle front-side electrode portion 1140, and the first cradle protrusion 1134 or the first cradle groove 1135 is not provided. For example, in the cradle 1000'' according to the third embodiment of the present invention, the cradle magnetic material 1700 may be disposed inside the device support body 1130, and the rear perspective view of the cradle 1000'' shown in FIG. 13 is the same as shown in FIG. 9B (or FIG. 11B). Therefore, the following description will focus on the differences.

Like the cradle 1000' according to the second embodiment, the cradle 1000'' according to the third embodiment of the present invention includes a device support portion 1100 and a battery accommodating portion 1200.

That is, the device support portion 1100 supports the rear side of the smart device 100' as at least a partial portion of the device support portion 1100 contacts the rear surface 120 of the smart device 100'. In addition, the battery accommodating portion 1200 is provided on the basis of the device support portion 1100, and accommodates the battery 2000 capable of supplying power to the smart device 100' through the device electrode portion 140 provided in the smart device 100'. In the cradle 1000" according to the third embodiment of the present invention, the device support portion 1100 may include a device support body 1130 and a cradle lower-side electrode portion 1170.

The device support body 1130 in the cradle 1000" according to the third embodiment is the same as that of the cradle 1000' according to the second embodiment. That is, the device support body 1130 may have an overall rectangular shape, and at least a partial portion of the device support body 1130 contacts the rear side of the smart device 100.

While the cradle front-side electrode portion 1140 is provided on the front side of the device support body 1130 in the cradle 1000' according to the second embodiment, a cradle lower-side electrode portion 1170 is located on the lower side of the device support body 1130 in the cradle 1000" according to the third embodiment.

The cradle lower-side electrode portion 1170 is connected to the device electrode portion 140 of the smart device 100' shown in FIG. 12 to supply power to the smart device 100'. The cradle lower-side electrode portion 1170 may be formed of, for example, a C-type terminal or a 5-pin terminal, and may be inserted into the device electrode portion 140 provided at one end of the smart device 100', as shown in FIG. 14. However, the cradle lower-side electrode portion 1170 is not necessarily limited thereto, and the cradle lower-side electrode portion 1170 may be configured in various forms. For example, like the cradle front-side electrode portion 1140, the cradle lower-side electrode portion 1170 may include a cradle lower-side electrode plate and one or more cradle lower-side electrodes disposed on the cradle lower-side electrode plate.

In the cradle 1000" according to the third embodiment of the present invention, like the cradle 1000' according to the second embodiment, the device support portion 1100 may further include one or more of a cradle rear-side electrode portion 1150 and a forward extension portion 1160.

Here, additionally mentioning the cradle rear-side electrode portion 1150, the cradle rear-side electrode portion 1150 is provided on the rear side of the device support body 1130, and is electrically connected to the cradle lower-side electrode portion 1170. In addition, as described above, the cradle rear-side electrode portion 1150 is connected to the battery front-side electrode portion 2200 of the battery 2000 accommodated in the battery accommodating portion 1200 to supply power to the smart device 100'. At this time, the power supplied through the battery accommodated in the battery accommodating portion 1200 may be used to charge the smart device 100' mounted on the cradle 1000", after passing through the battery front-side electrode portion 2200, the cradle rear-side electrode portion 1150, the cradle lower-side electrode portion 1170, and the device electrode portion 140.

Additionally mentioning the forward extension portion 1160, the forward extension portion 1160 extends from at least a lower portion of the entire area of the device support body 1130, and extends in a direction from a rear side toward a front side of the cradle 1000". At this time, the cradle lower-side electrode portion 1170 may be provided in the forward extension portion 1160. In this case, both the forward extension portion 1160 and the cradle lower-side electrode portion 1170 support the lower side of the smart device 100' mounted on the cradle 1000", thereby contributing to stably mounting the smart device 100 together.

Although the present invention has been described above with limited embodiments and drawings, the present invention is not limited to the above-described embodiments, and those skilled in the art to which the present invention pertains may make various modifications and alterations from the above description. Therefore, the technical idea of the present invention should be understood only by the claims, and it is to be noted that all equivalents or equivalent alternations thereof fall within the scope of the technical idea of the present invention.

The invention claimed is:

1. A cradle for mounting a smart device, the cradle comprising:
   a device support portion supporting a rear side of the smart device; and
   a battery accommodating portion provided on a basis of the device support portion, and accommodating a battery capable of supplying power to the smart device through a device electrode portion provided in the smart device,
   wherein the device electrode portion is provided on the rear side of the smart device, and
   the device support portion includes:
      a device support body of which at least a partial portion is in contact with the rear side of the smart device;
      a cradle front-side electrode portion provided on a front side of the device support body, and connected to the device electrode portion to supply power to the smart device; and
      a cradle rear-side electrode portion provided on a rear side of the device support body, electrically connected to the cradle front-side electrode portion, and connected to a battery front-side electrode portion of the battery accommodated in the battery accommodating portion to supply power to the smart device.

2. The cradle of claim 1, wherein
   the device support body includes:
   a smart device rear-side contact portion contacting the rear side of the smart device, with the cradle front-side electrode portion being provided therein; and
   a smart device rear-side non-contact portion located below the smart device rear-side contact portion, and recessed more than the smart device rear-side contact portion in a direction from a front side toward a rear side of the cradle, such that the smart device rear-side non-contact portion is not in contact with the rear side of the smart device.

3. The cradle of claim 1, wherein
   the device support portion further includes a forward extension portion extending from at least a lower portion of an entire area of the device support body, and extending in a direction from a rear side toward a front side of the cradle.

4. The cradle of claim 1, wherein the device supporting portion further comprises:
   a rearward extension portion extending from at least a lower portion of an entire area of the device support body, and extending in a direction from a front side toward a rear side of the cradle,
   wherein the rearward extension portion is configured to support a lower side of the battery accommodated in the battery accommodating portion.

5. The cradle of claim 1, wherein the device supporting portion further comprises:
  a cradle magnetic material disposed inside the device support body.

6. The cradle of claim 1, wherein
the cradle front-side electrode portion protrudes from a front surface of the device support body in a direction from a rear side toward a front side of the cradle, or
the cradle front-side electrode portion is recessed from the front surface of the device support body in a direction from the front side toward the rear side of the cradle.

7. The cradle of claim 1, wherein
a first cradle protrusion or a first cradle groove is provided on a front surface of the device support body, with the cradle front-side electrode portion as the center.

8. The cradle of claim 1, wherein
the cradle rear-side electrode portion is recessed from a rear surface of the device support body in a direction from a rear side toward a front side of the cradle, or
the cradle rear-side electrode portion protrudes from the rear surface of the device support body in a direction from the front side toward the rear side of the cradle.

9. The cradle of claim 1, wherein
a second cradle groove or a second cradle protrusion is provided on a rear surface of the device support body, with the cradle rear-side electrode portion as the center.

10. A battery comprising:
a battery body to be accommodated in the battery accommodating portion of claim 1; and
a battery front-side electrode portion provided on a front side of the battery body, and connected to the device electrode portion to supply power to the smart device when the battery body is accommodated in the battery accommodating portion,
wherein the battery front-side electrode portion protrudes from a front surface of the battery body in a direction from a rear side toward a front side of the battery, or
the battery front-side electrode portion is recessed from the front surface of the battery body in a direction from the front side toward the rear side of the battery.

11. The battery of claim 10, further comprising:
a battery magnetic material disposed inside the battery body.

12. The battery of claim 10, wherein
a first battery protrusion or a first battery groove is provided on a front surface of the battery body, with the battery front-side electrode portion as the center.

13. The battery of claim 10, further comprising:
a battery rear-side electrode portion provided on a rear side of the battery body, and connected to an external electrode portion of an external charging device to supply power through the external charging device.

14. The battery of claim 13, wherein
the battery rear-side electrode portion is recessed from a rear surface of the battery body in a direction from a rear side toward a front side of the battery, or
the battery rear-side electrode portion protrudes from the rear surface of the battery body in a direction from the front side toward the rear side of the battery.

15. The battery of claim 13, wherein
a second battery groove or a second battery protrusion is provided on a rear surface of the battery body, with the battery rear-side electrode portion as the center.

16. A cradle for mounting a smart device, the cradle comprising:
  a device support portion supporting a rear side of the smart device; and a battery accommodating portion provided on a basis of the device support portion, and accommodating a battery capable of supplying power to the smart device through a device electrode portion provided in the smart device,
wherein the device electrode portion is provided on the rear side of the smart device, and
the device support portion includes:
  a device support body of which at least a partial portion is in contact with the rear side of the smart device; and
  a cradle front-side electrode portion provided on a front side of the device support body, and connected to the device electrode portion to supply power to the smart device,
wherein the device support body includes:
  a smart device rear-side contact portion contacting the rear side of the smart device, with the cradle front-side electrode portion being provided therein; and
  a smart device rear-side non-contact portion located below the smart device rear-side contact portion, and recessed more than the smart device rear-side contact portion in a direction from a front side toward a rear side of the cradle, such that the smart device rear-side non-contact portion is not in contact with the rear side of the smart device.

17. A battery comprising:
a battery body to be accommodated in the battery accommodating portion of claim 1; and
a battery front-side electrode portion provided on a front side of the battery body, and connected to the device electrode portion to supply power to the smart device when the battery body is accommodated in the battery accommodating portion,
wherein a first battery protrusion or a first battery groove is provided on a front surface of the battery body, with the battery front-side electrode portion as the center.

18. A battery comprising:
a battery body to be accommodated in the battery accommodating portion of claim 1;
a battery front-side electrode portion provided on a front side of the battery body, and connected to the device electrode portion to supply power to the smart device when the battery body is accommodated in the battery accommodating portion; and
a battery rear-side electrode portion provided on a rear side of the battery body, and connected to an external electrode portion of an external charging device to supply power through the external charging device,
wherein the battery rear-side electrode portion is recessed from a rear surface of the battery body in a direction from a rear side toward a front side of the battery, or
the battery rear-side electrode portion protrudes from the rear surface of the battery body in a direction from the front side toward the rear side of the battery.

19. A battery comprising:
a battery body to be accommodated in the battery accommodating portion of claim 1;
a battery front-side electrode portion provided on a front side of the battery body, and connected to the device electrode portion to supply power to the smart device when the battery body is accommodated in the battery accommodating portion; and
a battery rear-side electrode portion provided on a rear side of the battery body, and connected to an external electrode portion of an external charging device to supply power through the external charging device, wherein a second battery groove or a second battery protrusion is provided on a rear surface of the battery body, with the battery rear-side electrode portion as the center.

\*    \*    \*    \*    \*